(12) United States Patent
Itoh

(10) Patent No.: US 9,244,335 B2
(45) Date of Patent: Jan. 26, 2016

(54) IMAGING DEVICE AND IMAGING METHOD

(71) Applicant: Kei Itoh, Yokohama (JP)

(72) Inventor: Kei Itoh, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 129 days.

(21) Appl. No.: 13/915,893

(22) Filed: Jun. 12, 2013

(65) Prior Publication Data

US 2013/0335619 A1 Dec. 19, 2013

(30) Foreign Application Priority Data

Jun. 15, 2012 (JP) ................................ 2012-135800

(51) Int. Cl.
| | |
|---|---|
| *H04N 5/225* | (2006.01) |
| *G03B 17/14* | (2006.01) |
| *G03B 13/36* | (2006.01) |
| *H04N 5/232* | (2006.01) |
| *G02B 7/36* | (2006.01) |

(52) U.S. Cl.
CPC ................ G03B 13/36 (2013.01); G02B 7/365 (2013.01); H04N 5/23212 (2013.01)

(58) Field of Classification Search
CPC ............................... H04N 5/2254; G03B 17/14
See application file for complete search history.

(56) References Cited

U.S. PATENT DOCUMENTS

| | | | | |
|---|---|---|---|---|
| 2007/0030382 A1* | 2/2007 | Suda | ...................... | H04N 5/235 348/360 |
| 2007/0230779 A1* | 10/2007 | Sato | .................... | H04N 5/23232 382/167 |
| 2008/0199056 A1* | 8/2008 | Tokuse | ............... | G06K 9/00295 382/118 |
| 2010/0209091 A1* | 8/2010 | Ogino | ...................... | G02B 7/38 396/98 |
| 2012/0320240 A1* | 12/2012 | Kano | ................... | H04N 5/3572 348/241 |
| 2013/0093941 A1 | 4/2013 | Itoh | | |

FOREIGN PATENT DOCUMENTS

| | | |
|---|---|---|
| JP | 39-5265 | 4/1964 |
| JP | 2005-122016 | 5/2005 |
| JP | 2006-243101 | 9/2006 |

* cited by examiner

*Primary Examiner* — Lin Ye
*Assistant Examiner* — John H Morehead, III
(74) *Attorney, Agent, or Firm* — Oblon, McClelland, Maier & Neustadt, L.L.P.

(57) ABSTRACT

An imaging device includes an imaging element configured to output an image signal in accordance with a target image acquired via an imaging lens, an autofocus detector configured to decide a focus in accordance with image data obtained from the image signal, a lens movement section configured to move the imaging lens on the basis of the focus, a driving condition setting section configured to set a driving condition of the imaging element, a point light source detector configured to determine whether or not the target is a point light source target on the basis of a brightness component of the image data, a target detector configured to detect a certain target from the image data, and a filter selection section configured to select a filter through which the image data is to be transmitted.

6 Claims, 24 Drawing Sheets

FIG. 4
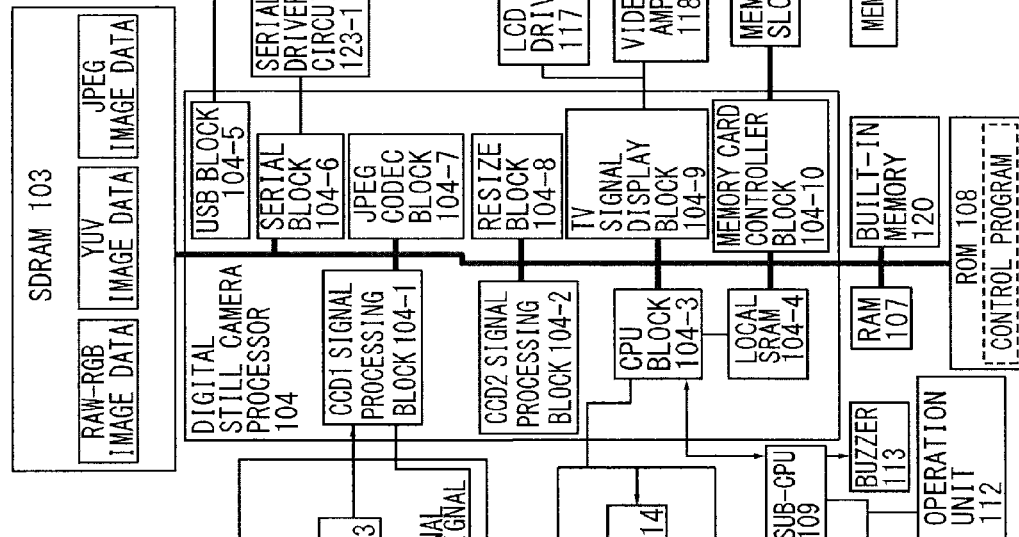
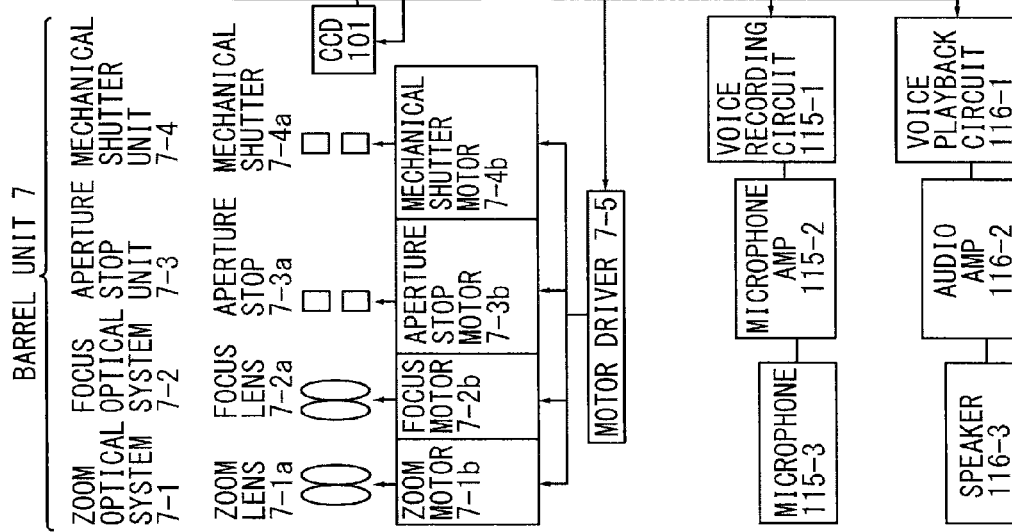

FIG.12

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

FIG.21
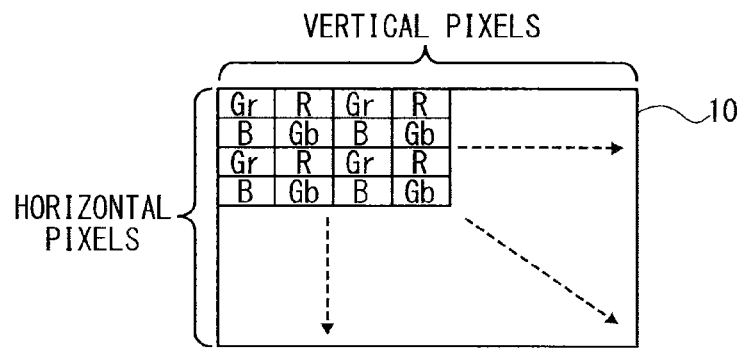
FIG.22A
| -1 | 2 | -1 |
|---|---|---|
FIG.22B
| -1 | 0 | 2 | 0 | -1 |
|---|---|---|---|---|
FIG.22C
| -1 | -1 | 1 | 2 | 1 | -1 | -1 |
|---|---|---|---|---|---|---|
FIG.23
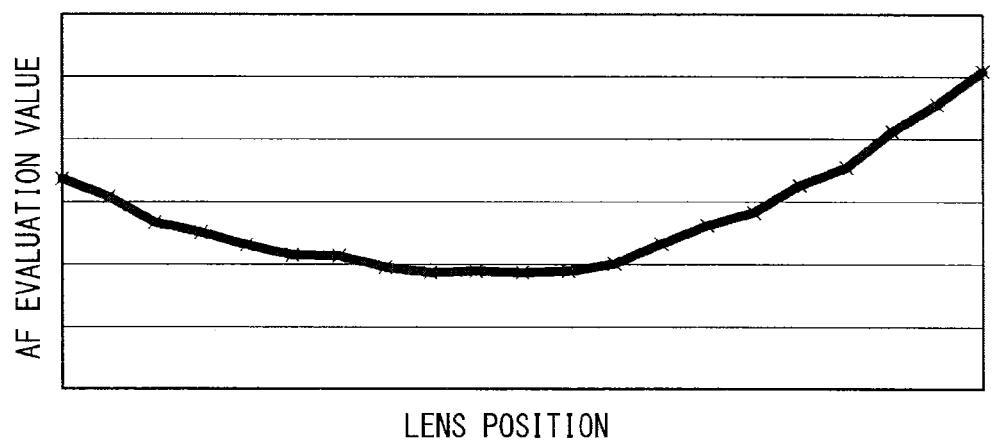

FIG.27
(a)
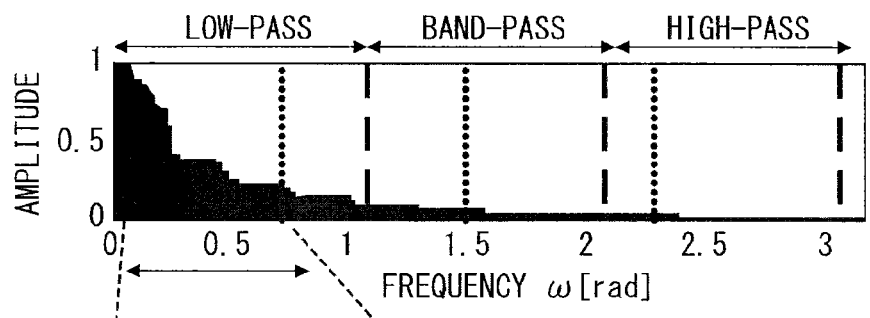
(b)
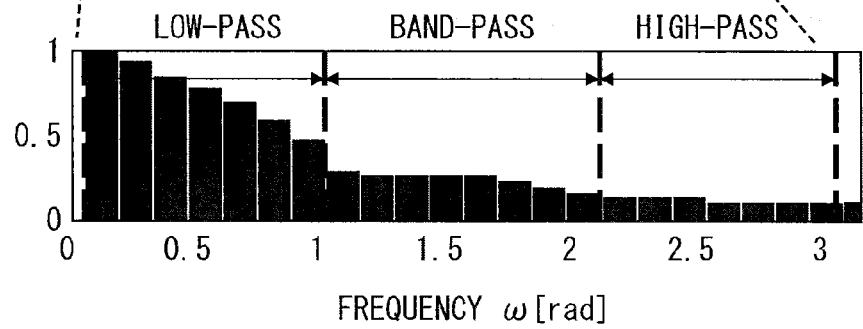

IMAGING DEVICE AND IMAGING METHOD

PRIORITY CLAIM

The present application is based on and claims priority from Japanese Patent Application No. 2012-135800, filed on Jun. 15, 2012, the disclosure of which is hereby incorporated by reference in its entirety.

BACKGROUND

1. Technical Field

The present invention relates to an imaging device provided with an autofocus function and an imaging method in the imaging device, and more specifically an imaging device and an imaging method capable of accurately performing autofocus processing to a target in which a point light source is dominant (for example, a night scene).

2. Description of the Related Art

Digital cameras (hereinafter referred to as "imaging devices") provided with an autofocus unit (hereinafter referred to as "AF unit") are known. The AF unit generates information for deciding an in-focus position using image data generated from image signals acquired for a target by an imaging element, and automatically moves the imaging lens to the in-focus position on the basis of the generated information.

There are multiple techniques of AF processing performed by the AF unit. The AF unit mounted on a general imaging device uses a hill climbing AF technique (for example, see Japanese Patent Application Publication No. S39-5265). The hill climbing AF technique calculates an integral value of brightness differences between neighboring pixels on the basis of image signals that an imaging element outputs based on a target image formed on the light-receiving surface, and determines the in-focus position using the integral value. The integral value mentioned above is information for deciding the in-focus position, and is referred to as an "AF evaluation value".

When an imaging lens is at the in-focus position where a target image is focused on the light-receiving surface of the imaging element, the outline of the target image on the light-receiving surface is sharp. The AF evaluation value calculated using image data generated from image signals of the target image when the imaging lens is at the in-focus position is larger than that calculated when the imaging lens is at any other position (position other than the in-focus position). Accordingly, when the imaging lens is at the in-focus position, the AF evaluation value takes its maximum value theoretically. Moreover, the AF evaluation value increases as the imaging lens approaches the in-focus position from an out-of-focus position, and decreases as the imaging lens moves away from the in-focus position.

The hill climbing AF technique is to detect the peak position of the AF evaluation values on the basis of the increase or decrease tendency of the AF evaluation value mentioned above. The AF unit employing the hill climbing AF technique calculates the AF evaluation value while moving the imaging lens. The AF evaluation value is calculated at predetermined time points specified in advance or at constant time intervals. The position of the imaging lens where the AF evaluation value is maximum (the peak position of the AF evaluation values) can be determined by associating each AF evaluation value calculated, with the position of the imaging lens where the AF evaluation value is calculated. The imaging lens is moved to this determined position thereby to be automatically focused on the target.

As described above, the hill climbing AF technique involves moving the lens over an entire movement range once, determining the position of the lens where the maximum AF evaluation value can be obtained within the movement range, and moving the lens to the determined position.

More specifically, the start position of the AF operation is firstly set to the center position of the lens movement range, and the lens is moved to the position. Next, the lens is moved from the center position in a certain direction, for example, to the closest focus position, and then is reversely moved toward the infinite focus position. The AF evaluation value is calculated within the range of this movement at predetermined time points to determine the lens position where the maximum AF evaluation value can be obtained.

Meanwhile, recent imaging elements have increased resolution. Many of the imaging elements have several hundred mega pixels. The increase in the number of pixels of the imaging element makes the density of pixels higher, and accordingly makes a pixel pitch smaller. Having the smaller pixel pitch, each pixel has less sensitivity. In order to solve this problem, an imaging element having multiple driving conditions (driving modes) is known. The driving modes of the imaging element (hereinafter referred to as merely "driving modes") are modes depending on which an image signal output operation of the imaging element changes by, for example, addition or reduction of image signals outputted from respective pixels for a target image formed on the light-receiving surface. For example, when the image signals are added up under a predetermined condition, the brightness is doubled. This increases the sensitivity.

Among the driving modes of the imaging element, the driving mode in which image signals are added up as described above is used for monitoring processing in which an image for checking a target to be photographed is displayed on an LCD at the time of image capturing. The image signals outputted In this driving mode, the image signals from pixels are added up and thereby the number of pixels in the image signals is reduced from the total number of pixels. In other words, the number of image signals for generating image data for the display is reduced, so that the density of the image becomes low. Accordingly, this driving mode is suitable for the monitoring processing of performing display processing with predetermined time intervals.

FIG. 21 depicts an example of a typical pixel array of an imaging element. The pixel array of FIG. 21 is referred to as Bayer array. Signals (image signals) read from the pixels of the imaging element of the Bayer array are added up in the horizontal direction and the vertical direction, thereby making it possible to reduce the number of signals to be processed in the following stages. For example, in generating image data used for the monitoring processing, the number of image signals is reduced by "addition and(or) reduction" of the image signals on the basis of a certain rule instead of processing every one of image signals outputted from all the pixels. FIG. 17 depicts an example of a signal readout state of a CCD 101 set in a driving mode with addition of image signals from two pixels in the horizontal direction and in the vertical direction.

However, the foregoing addition of the image signals from the pixels in the horizontal direction and of the image signals from the pixels in the vertical direction may cause a phenomenon in which the abnormal AF evaluation value is obtained for some target. This is because the addition of the pixels decreases the spatial frequency band of the image.

This phenomenon occurs differently depending on whether photographing is for a bright target at daytime or is for a dark target at night. FIGS. 26A to 26C are views showing examples of targets, FIG. 26A depicts a target at daytime, FIG. 26B depicts a target at night, and FIG. 26C depicts a target including a person at night. For example, in the photographing at daytime as shown in FIG. 26A, the contrast of target in the image is sharp because the target is photographed in a bright light condition. However, in the photographing at night as shown in FIG. 26B and FIG. 26C, the contrast of the target in the image is less sharp because the whole target is dark. In such photographing at night, if a building is included in the target, light leaking from the windows of rooms (illumination light or the like) almost dominates the whole target. When viewed at a distant place, the illumination light leaking from the building looks like "points". The target dominated by the "objects looking like points" is referred to as a point light source target.

The point light source target has almost no contrast. Accordingly, the AF evaluation value generated from the point light source target follows the curve as shown in FIG. 23. In FIG. 23, the horizontal axis indicates the position of an imaging lens, and the longitudinal axis indicates the AF evaluation value. As shown in FIG. 23, a peak position cannot be determined on the basis of the AF evaluation values generated from the point light source target. In the photographing at daytime, even if point light source target largely occupies the whole target, a target around the point light source target is dominant in contrast, thereby making it possible to determine the peak position of the AF evaluation values. However, when a target which is dark as a whole includes a point light source target, for example, at night, the light of the point light source target expands more as the lens becomes more out of focus. This leads to the increased AF evaluation value, and the peak position cannot be determined.

To address this phenomenon, proposed is an imaging device capable of performing autofocus with high accuracy even at the low brightness by calculating an AF evaluation value while merging filters (for example, see Japanese Patent Application Publication No. 4679179). However, when a point light source target is photographed using the imaging device of Japanese Patent Application Publication No. 4679179, autofocus processing is more difficult because the frequency band is narrowed by the addition of pixels and the filters are merged.

Moreover, another imaging device is proposed which prevents the phenomenon mentioned above by correction on the basis of the ratio of high brightness portions (point light source portions) to improve the accuracy of the AF (for example, see Japanese Patent Application Publication No. 4553570). However, in photographing at night, even if the correction is made on the basis of the ratio of point light sources, it is difficult to actually determine the in-focus position because the brightness of surroundings of the point light sources is low.

As described above, a target in which point light sources are dominated (saturated) is difficult to automatically focus on because a peak of the AF evaluation values cannot be determined due to the low contrast of the target. Meanwhile, if the number of pixels added in the horizontal direction of the imaging element is reduced, the peak of the AF evaluation values can appear although the AF evaluation value would usually have no peak otherwise.

FIG. 24 is a graph showing AF evaluation values with the different numbers of horizontal pixels added, and indicates shifts in the AF evaluation values in cases where the number of horizontal pixels added is set to 1-pixel, 2-pixel, 3-pixel, and 4-pixel. As shown in FIG. 24, even if no peak appears in the AF evaluation values in the case of the "4-pixel", the peak appears by reducing the number of pixels added in the horizontal direction. In FIG. 24, the peak appears in the AF evaluation values in the case of the horizontal 1-pixel addition.

Therefore, in a target such as a point light source target with the low (small) contrast, the factor for preventing a peak from appearing is considered not to be the point light source but to be the number of pixels added. However, if the number of pixels added is reduced (no pixel addition is performed), the sensitivity is decreased. Accordingly, it is required to cause a peak to appear in the AF evaluation values without decreasing the sensitivity.

Further, when the frequency band of the image is expanded without pixel addition, it is required to determine a frequency band in which a target is present. FIG. 27 is a histogram (a) showing an example of frequency distribution of an image for a certain target in, the histogram obtained by performing fast Fourier transform (FFT) processing on the image, and is a histogram (b) obtained by performing FFT processing on an image generated by horizontal 4-pixel addition from the image of the histogram (a). Thus, the frequency distribution (b) of the image by the horizontal 4-pixel addition is the same as the enlarged distribution in the left one-fourth portion of the frequency distribution (a) of the image with no pixel addition.

In other words, the pixel addition significantly limits the frequency band of the image. Accordingly, generation of the AF evaluation value on the basis of the limited image actually results in the AF evaluation value in the low-frequency band even by use of a high-pass filter for the image data. Thus, for a low-frequency band dominant target such as a point light source target, it is desired to reduce the number of pixels added and to apply a high-pass filter. However, simply reducing the number of pixels added and applying the high-pass filter cause another problem.

For example, as shown in FIG. 26C, in a target where a person is present in a point light source, the AF evaluation value might be decreased due to the person as the low-frequency band dominant target. In other words, the AF operation needs to be performed by detecting the frequency component of a target, and if necessary, by changing the number of pixels added and the transmit frequency band of a filter.

SUMMARY

The present invention is made in view of the foregoing problems, and aims to provide an imaging device and an imaging method capable of accurately performing autofocus processing on a target such as a night scene in which a point light source is dominated, and of accurately performing autofocus processing even under an environment in which a point light source and a person are present together like in a night scene portrait.

An imaging device according to one embodiment of the present invention includes: an imaging element configured to output an image signal in accordance with a target image acquired via an imaging lens; an autofocus detector configured to decide a focus in accordance with image data obtained from the image signal; a lens movement section configured to move the imaging lens on the basis of the focus; a driving condition setting section configured to set a driving condition of the imaging element; a point light source detector configured to determine whether or not the target is a point light source target on the basis of a brightness component of the image data; a target detector configured to detect a certain target from the image data; and a filter selection section configured to select a filter through which the image data is to be transmitted, wherein the driving condition setting section sets the driving condition of the imaging element on the basis of a determination result by the point light source detector, the filter selection section selects the filter on the basis of the driving condition of the imaging element and a detection result by the target detector, and the autofocus detector decides the focus on the basis of the image data which is transmitted through the selected filter.

BRIEF DESCRIPTION OF THE DRAWINGS

The accompanying drawings are included to provide further understanding of the present disclosure, and are incorporated in and constitute a part of this specification. The drawings illustrate embodiments of the present disclosure and, together with the specification, serve to explain the principle of the present disclosure.

FIG. 4 is a function block diagram showing an example of an electric control system of the imaging device;

FIG. 12 is a view showing an example of a brightness detection area in the imaging device;

FIG. 21 is a view showing an example of a pixel array pattern of the imaging element provided in the imaging device;

FIGS. 22A to 22C depict examples of the coefficient of a digital filter used by the imaging device, FIG. 22A depicts a high-pass filter, FIG. 22B depicts a band-pass filter, and FIG. 22C depicts a low-pass filter;

FIG. 23 is a graph showing an example of change in AF evaluation values of a point light source target;

FIG. 25A depicts a graph showing a case of horizontal 2-pixel addition, FIG. 25B depicts a graph showing a case of horizontal 4-pixel addition, and FIG. 25C depicts a graph showing a case of no addition;

FIG. 26A depicts a target at daytime, FIG. 26B depicts a target at night, and FIG. 26C depicts a target including a person at night;

FIG. 27 depicts examples of a histogram when a driving mode of the imaging element provided in the imaging device is set to a mode of performing no addition and no reduction of an image signal in (a) and a mode of performing horizontal 2-pixel addition in (b), respectively;

DETAILED DESCRIPTION OF THE PREFERRED EMBODIMENTS

Appearance of Imaging Device

Figure 1:
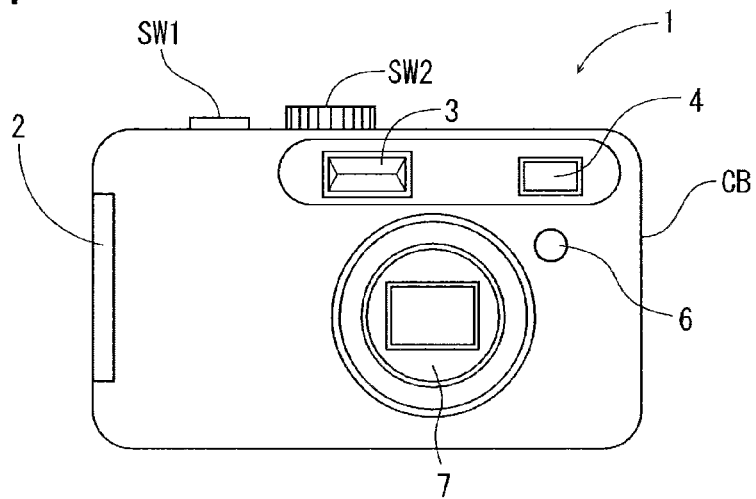
FIG. 1 is a front view showing an example of a camera which is an imaging device according to the present invention.

Hereinafter, an embodiment of an imaging device and an imaging method according to the present invention is described with reference to the drawings. Firstly, an example of an appearance of the imaging device according to the present invention is described using FIG. 1 to FIG. 3. FIG. 1 is a front view of a digital camera 1 which is an example of the imaging device according to the present invention. In FIG. 1, on a front surface of a camera body CB which is a case of the digital camera 1, disposed are a strobe light emitter 3, an object plane of a finder 4, a remote control light receiver 6, and a barrel unit 7 including an imaging lens and constituting an imaging optical system. A lid 2 for a memory card mounting chamber and a battery mounting chamber is provided on one side surface portion of the camera body CB.

Figure 2:
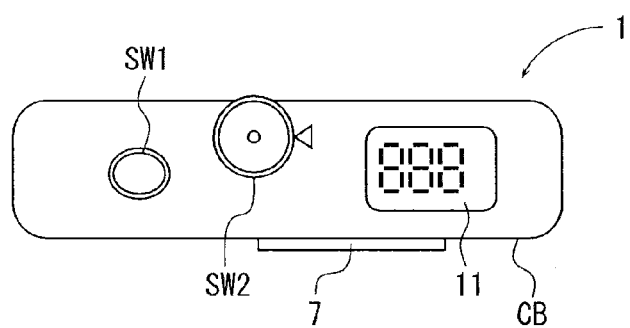
FIG. 2 is a top view showing an example of the camera which is the imaging device.

FIG. 2 is a top view of the digital camera 1. In FIG. 2, a release switch SW1, a mode dial SW2, and a sub-liquid crystal display 11 are disposed on an upper surface of the camera body CB.

Figure 3:
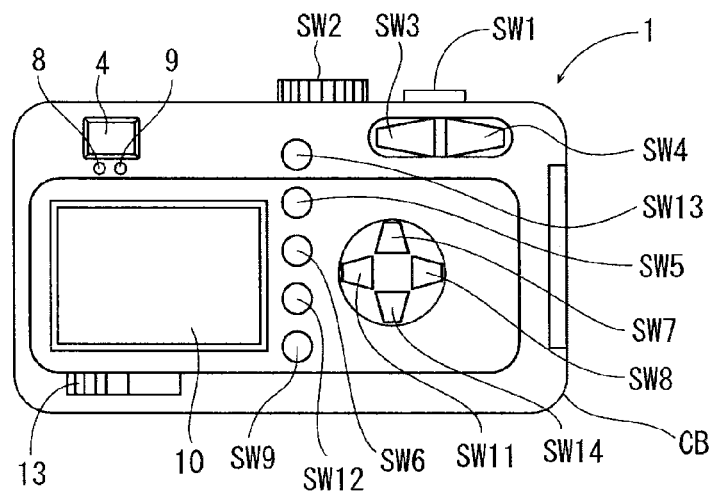
FIG. 3 is a rear view showing an example of the camera which is the imaging device.

FIG. 3 is a rear view of the digital camera 1. In FIG. 3, on a rear surface of the camera body CB, disposed are an eye piece of the finder 4, an AF light emitting diode (hereinafter light emitting diode is referred to as "LED") 8, a strobe LED 9, a liquid crystal display 10 (hereinafter referred to as "LCD 10") which is display for displaying a target image, an enlarged image, and various kinds of setting screens, a power switch 13, a wide angle direction zoom switch SW3, a telescopic direction zoom switch SW4, a self-timer setting and canceling switch SW5, a menu switch SW6, an upward movement and strobe set switch SW7, a right movement switch SW8, a display switch SW9, a downward movement and macro switch SW14, a left movement and image confirmation switch SW11, an OK switch SW12, and a quick access switch SW13.

Function Block of Imaging Device

Next, an example of a function block of the imaging device according to the present invention is described. FIG. 4 is a function block diagram showing a function configuration example of the digital camera 1. Various kinds of operations (processing) of the imaging device according to the present invention are controlled by a digital still camera processor 104 (hereinafter, merely referred to as "processor 104") configured to include a digital signal processing IC (integrated circuit) or the like, and an imaging program operated in the processor 104.

The processor 104 which is image processing section is configured to include a first CCD (charge-coupled device) signal processing block 104-1, a second CCD signal processing block 104-2, a CPU (central processing unit) block 104-3, a local SRAM (SRAM: static random access memory) 104-4, a USB (universal serial bus) block 104-5, a serial block 104-6, a JPEG codec block 104-7, a resize block 104-8, a TV signal display block 104-9, and a memory card controller block 104-10. These blocks are mutually connected via bus lines.

An SDRAM (synchronous dynamic random access memory) 103 for storing RAW-RGB image data, YUV image data, and JPEG image data, an RAM 107, a built-in memory 120, and an ROM 108 in which a control program which is an imaging program is stored are disposed outside the processor 104, and these components are connected to the processor 104 via bus lines. The control program stored in the ROM 108 includes a program for controlling operations of the imaging device according to the present invention.

The barrel unit 7 is provided with a zoom optical system 7-1 including a zoom lens 7-1a, a focus optical system 7-2 including a focus lens 7-2a, an aperture stop unit 7-3 including an aperture stop 7-3a, and a mechanical shutter unit 7-4 including a mechanical shutter 7-4a, and these components configure an imaging optical system.

The zoom optical system 7-1, the focus optical system 7-2, the aperture stop unit 7-3, and the mechanical shutter unit 7-4 are respectively driven by a zoom motor 7-1b, a focus motor 7-2b serving as focus lens movement section, an aperture stop motor 7-3b, and a mechanical shutter motor 7-4b.

The respective motors of the zoom motor 7-1b, the focus motor 7-2b, the aperture stop motor 7-3b, and the mechanical shutter motor 7-4b are driven by the motor driver 7-5. The operation of the motor driver 7-5 is controlled by the CPU block 104-3 of the processor 104.

The zoom lens 7-1a and the focus lens 7-2a included in the barrel unit 7 configure an imaging lens which forms an image of a target image on a light-receiving surface of a CCD 101 which is an imaging element. The CCD 101 converts the target image formed on the light-receiving surface into an electric image signal, and outputs the electric image signal to an F/E-IC (front end IC) 102.

The F/E-IC 102 includes a CDS (correlated double sampling unit) 102-1, an AGC (automatic gain controller) 102-2, and an A/D (analog-digital) converter 102-3, and performs predetermined processing on the image signal converted from the target image to convert the image signal into a digital signal. The converted digital image signal is inputted into the CCD signal processing block 104-1. These signal processing operations are controlled by a VD signal (vertical drive signal) and an HD signal (horizontal drive signal) outputted from the CCD signal processing block 104-1 of the processor 104 via a TG (timing generator) 102-4.

The CCD signal processing block 104-1 performs signal processing, such as the white balance adjustment and the γ adjustment, on digital image data inputted from the CCD 101 through the F/E-IC 102, and outputs a VD signal and an HD signal.

The CPU block 104-3 of the processor 104 controls a voice recording operation by a voice recording circuit 115-1. The voice recording circuit 115-1 records a voice signal converted in a microphone (microphone) 115-3 and amplified by a microphone amplifier (microphone AMP) 115-2 in response to a command from the CPU block 104-3.

Moreover, the CPU block 104-3 also controls an operation of a voice playback circuit 116-1. In the voice playback circuit 116-1, in response to a command from the CPU block 104-3, a voice signal recorded in an appropriate memory is amplified by an audio amplifier (audio AMP) 116-2, the amplified voice signal is inputted into a speaker 116-3, and the speaker 116-3 outputs playback of a voice. Moreover, the CPU block 104-3 controls a strobe circuit 114 to be operated to cause the strobe light emitter 3 to emit illumination light.

In addition, the CPU block 104-3 is also coupled to a sub-CPU 109 disposed outside the processor 104, and the sub-CPU 109 controls display by a sub-LCD 11 via a sub-LCD driver 111. Moreover, the sub-CPU 109 is also coupled to an AF LED 8, the strobe LED 9, the remote control light receiver 6, an operation unit 112 including the switch SW1 to the switch SW14, and a buzzer 113.

The USB block 104-5 is coupled to a USB connector 122. The serial block 104-6 is coupled to an RS-232C connector 123-2 via a serial driver circuit 123-1.

TV signal display block 104-9 is coupled to the LCD 10 via an LCD driver 117, and the TV signal display block 104-9 is also coupled to a video jack 119 via a video amplifier (AMP) 118.

The memory card controller block 104-10 is coupled to a card contact of a memory card slot 191. When a memory card is mounted in the memory card slot 191, the memory card controller block 104-10 comes into contact with and is electrically connected to a contact of the memory card, and stores an image file in the mounted memory card.

Operation of Imaging Device

Next, an operation of the imaging device according to the present invention is described. In the digital camera 1 shown in FIG. 1 to FIG. 3, when the mode dial SW2 is operated to select a "recording mode", the digital camera 1 starts an operation in the recording mode. More specifically, the digital camera 1 starts an operation in the recording mode when the CPU block 104-3 detects a recording mode-ON state of the mode dial SW2 included in the operation unit 112 shown in FIG. 4 through the sub-CPU 109.

The CPU block 104-3 controls the motor driver 7-5 to move the barrel unit 7 to a position capable of taking an image. In addition, the power is turned on in the respective units of the CCD 101, the F/E-IC 102, the LCD 10, and the like, and the operation in a finder mode is started.

Operation in Finder Mode

In the digital camera 1 being operated in the finder mode, an image signal for a target image formed on the light-receiving surface of the CCD 101 via the imaging lens is outputted to the CDS 102-1. This analog RGB signal is converted into a digital image signal by the A/D converter 102-3 via the AGC (automatic gain control circuit) 102-2. The signals of R, G, B included in this digital image signal are converted into YUV image data by YUV conversion provided in the second CCD signal processing block 104-2 in the processor 104, and is recorded in the SDRAM 103 serving as a frame memory. Note that, the second CCD signal processing block 104-2 performs suitable processing such as filtering processing on the RGB image signal to convert it into YUV image data.

The YUV image data is read by the CPU block 104-3, is sent to the video amplifier 118 and the video jack 119 via the TV signal display block 104-9, and is displayed on a TV (television) connected to the video jack 119.

Moreover, the YUV image data read by the CPU block 104-3 is sent to the LCD 10 via the LCD driver 117 and displayed. This processing is performed with an interval of 1/30 second to update the display, which is an operation in the finder mode in which an imaging target can be taken while being viewed by the display on the LCD 10.

Operation of Face Recognition Function

In addition, the digital camera 1 is provided with a face recognition function, and performs AF processing using this face recognition function. The face recognition function is a function when a person is included in a target, an AF area where a face of the person is present is automatically determined, and an AF evaluation value is calculated from image data included in the determined AF area (area including the face).

The face recognition function provided in the digital camera 1 is operated when a face recognition mode is selected. The selection of the face recognition mode is performed by an operation of the menu switch SW6 or an operation of the quick access switch SW13. When the face recognition mode is being selected, face recognition processing is periodically executed in the finder mode. A number of face recognition methods can be used as appropriate as for the face recognition function provided in the digital camera 1. The methods include, for example, a method of extracting a head part area of a front person image by utilizing geometric shape characteristics of respective parts of hair, eyes, a mouth, and the like configuring the head part of the front person image, such as "a method of extracting a face area in which a color image is occluded to recognize a flesh-colored area" or "a method of extracting a face area from a still light and shade scene image", and a method of extracting a moving image of a front person image by utilizing the outline edge of the person image generated due to a subtle motions of the person between frames, or the like.

Driving Mode of Imaging Element

Figure 16:
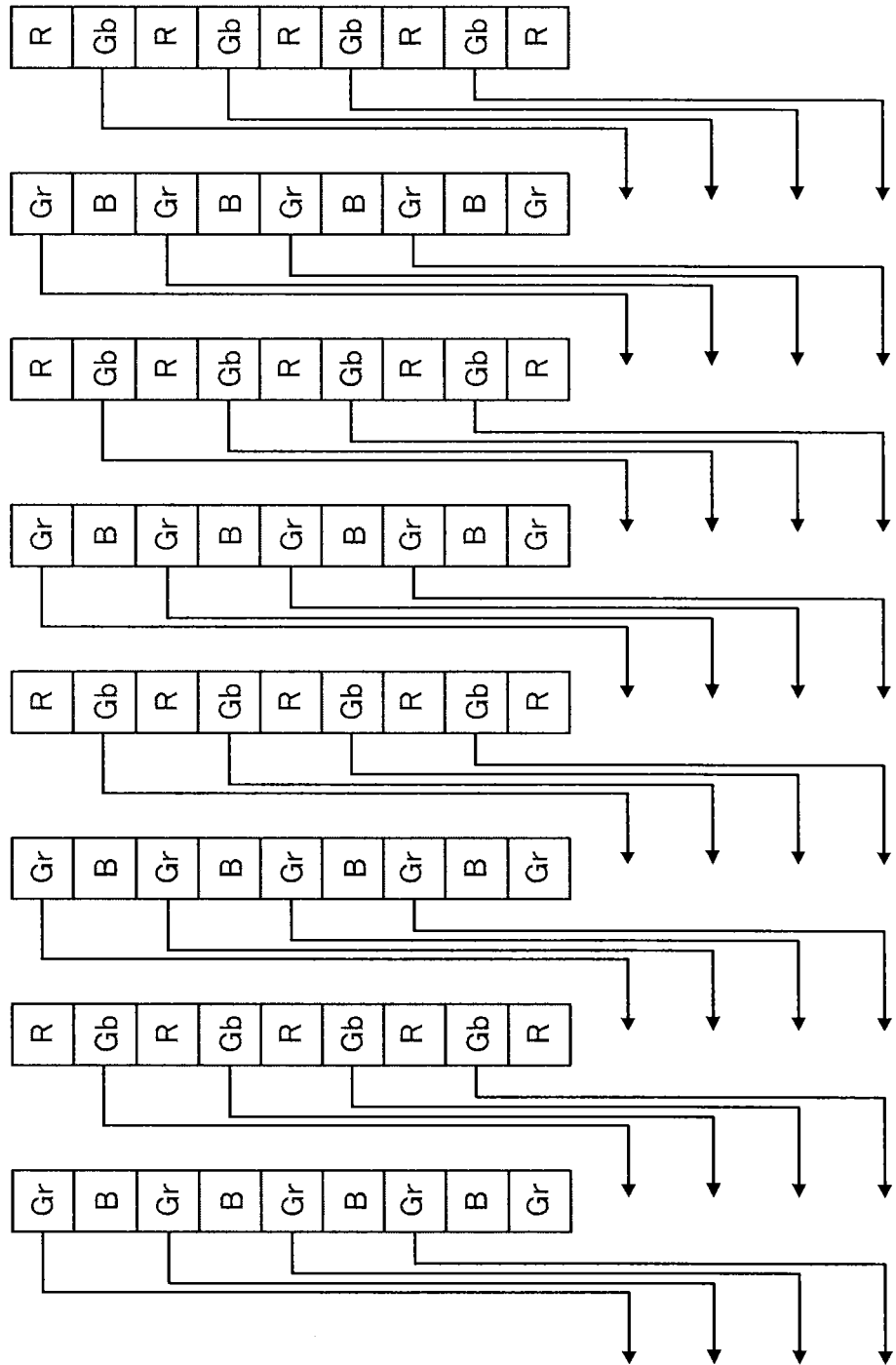
FIG. 16 is a view showing an example of a readout pattern of an image signal from each pixel of an imaging element.
Figure 17:
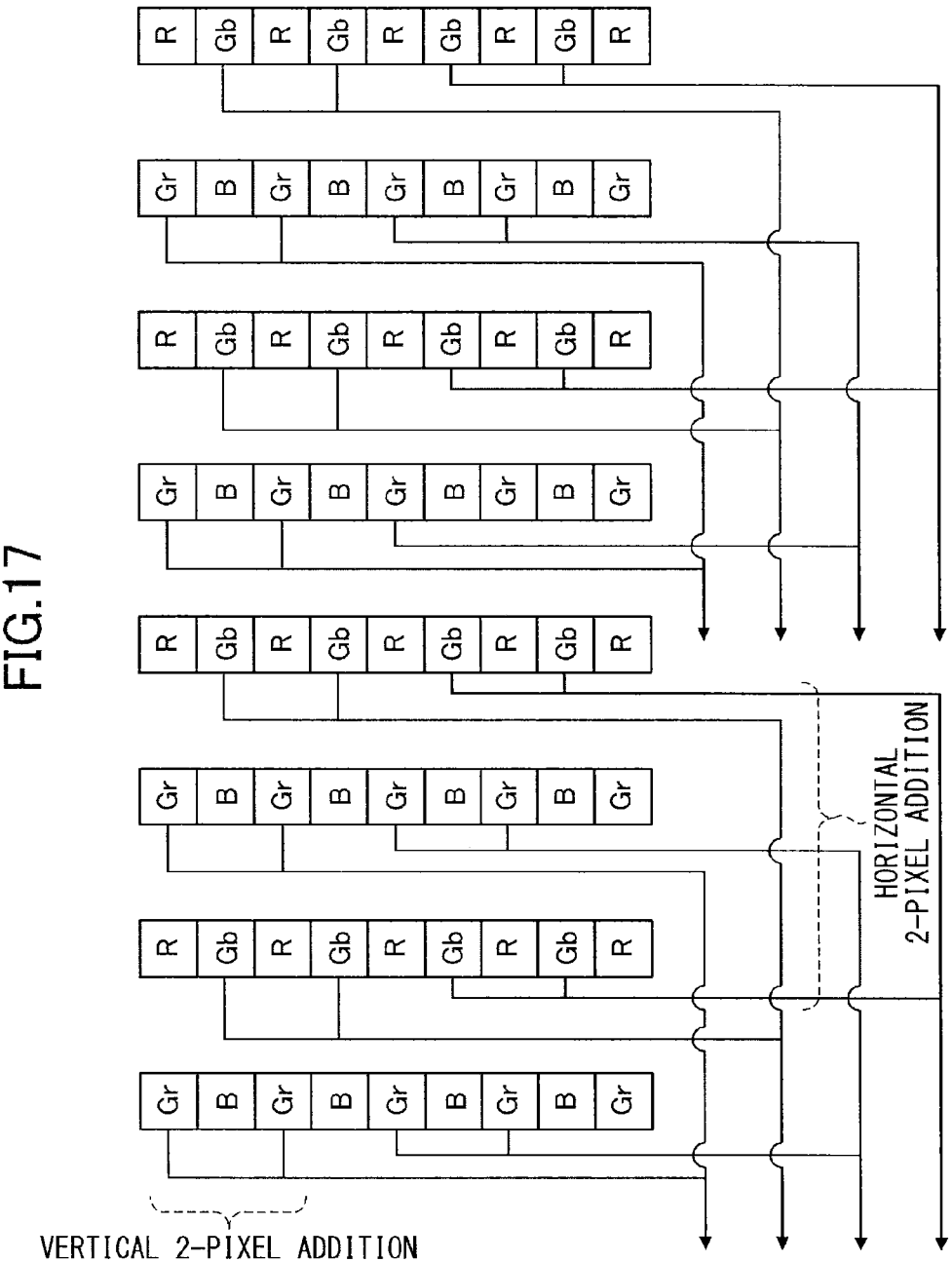
FIG. 17 is a view showing another example of a readout pattern of an image signal from each pixel of an imaging element.
Figure 18:
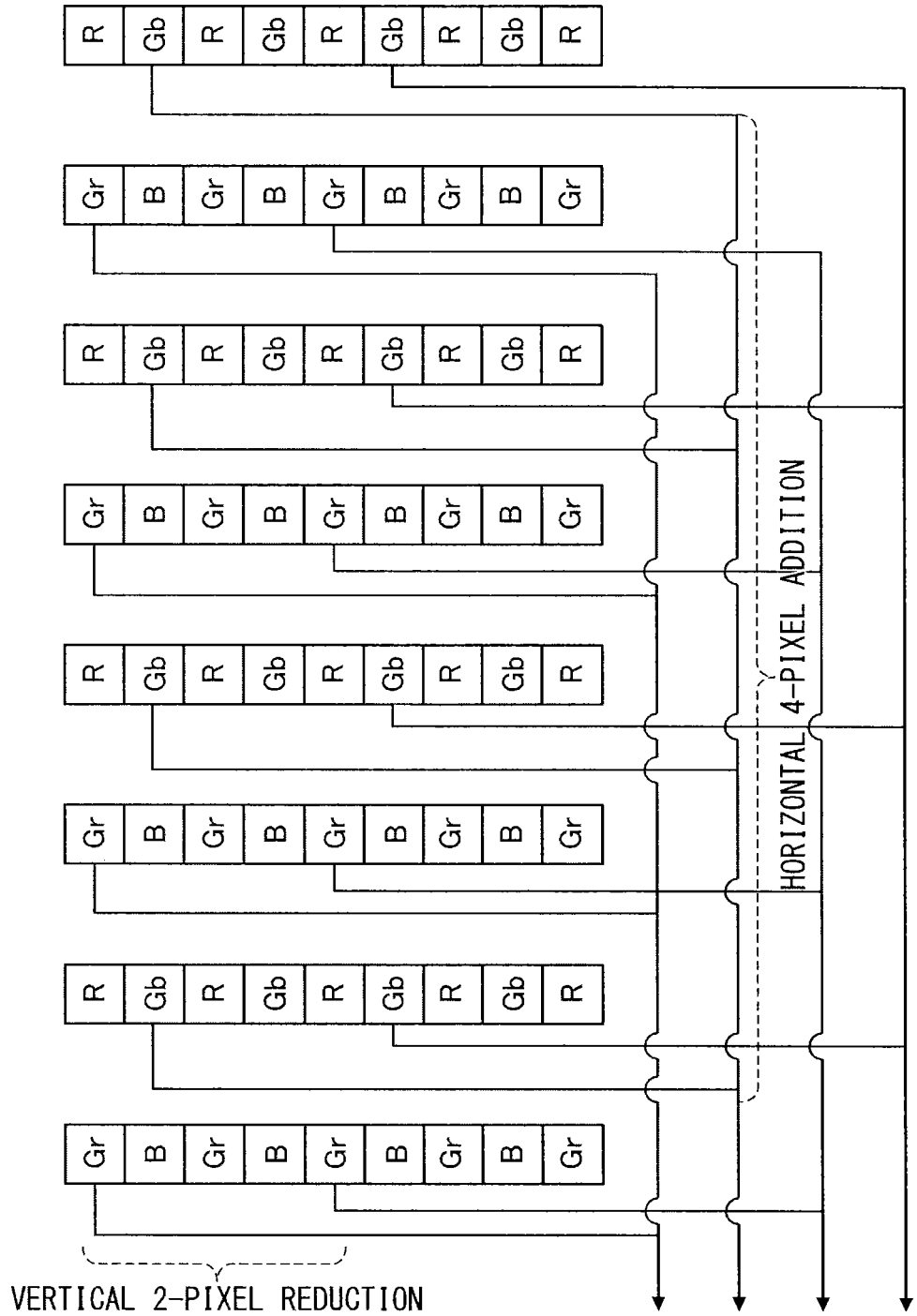
FIG. 18 is a view showing still another example of a readout pattern of an image signal from each pixel of the imaging element.
Figure 19:
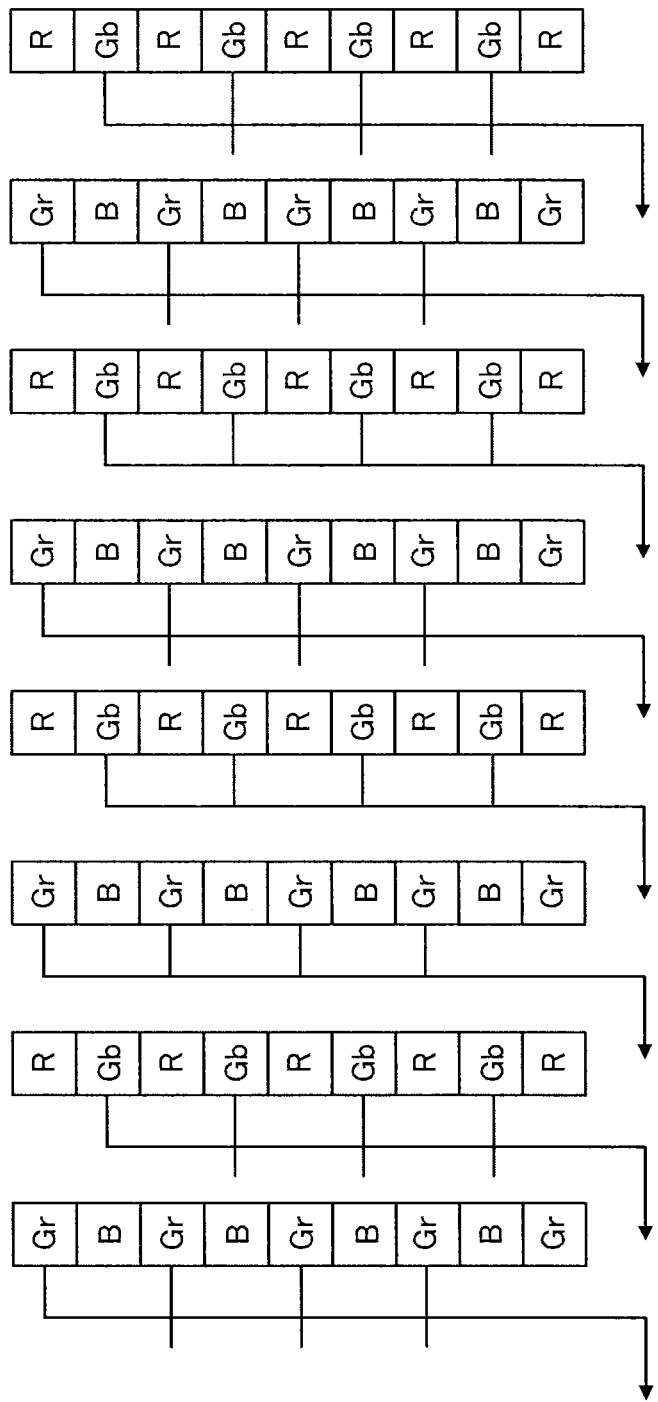
FIG. 19 is a view showing still another example of a readout pattern of an image signal from each pixel of the imaging element.

Moreover, multiple driving modes (driving conditions) can be selectively set to the CCD 101. An output condition for an image signal outputted from the CCD 101 is changed depending on the driving mode. The driving mode includes, for example, a mode (hereinafter referred to as a "mode 1") as shown in FIG. 16 in which neither horizontal pixel "addition and reduction" nor vertical pixel "addition and reduction" are performed, a mode (hereinafter referred to as a "mode 2") as shown in FIG. 17 in which horizontal "2-pixel addition" and vertical "2-pixel addition" are performed, a mode (hereinafter referred to as a "mode 3 ") as shown in FIG. 18 in which horizontal "4-pixel addition" and vertical "2-pixel reduction" are performed, and a mode (hereinafter referred to as a "mode 4") as shown in FIG. 19 in which no horizontal pixel "addition and reduction" and vertical "4-pixel addition" are performed.

In the mode 1, image signals from all the pixels are outputted to generate image data, thereby making it possible to obtain a sharp image. Accordingly, the mode 1 is a mode set when a still image is photographed. However, because more time is required for performing image processing using the image signals from all the pixels, the mode 1 is not suitable for processing of generating image data to be displayed (image data for monitoring) on the LCD 10 at a predetermined time interval. Moreover, because the image signals from all the pixels of the CCD 101 cannot be outputted at once (simultaneously) and cannot be collectively image-processed, the image signals need to be divided into a number of frames for transfer. Accordingly, the mode 1 is an operation mode not suitable for the finder mode.

Therefore, the driving mode of the CCD 101 when being operated in the finder mode is set in the "mode 3". The mode 3 is most suitable for the finder mode because the sensitivity of pixels to be read can be improved while the number of pixels to be read is reduced. Note that, the mode 2 and the mode 4 are described later.

In the digital camera 1 being operated in the finder mode, when the release button SW1 is pressed, an AF evaluation value indicating the degree of in-focus is calculated using digital RGB image data incorporated into the first CCD signal processing block 104-1.

AF Evaluation Value

An image of a target in an in-focus state has a sharp edge portion so that the high-frequency component of the spatial frequency included in the image data in the in-focus state is maximum. The AF evaluation value is calculated using image data of the target, and therefore reflects the level of the high-frequency component as a differential value relative to a change amount, for example.

Accordingly, it is possible to set a position of the focus lens 7-2a at which image data with the maximum AF evaluation value is acquired to an in-focus position. By considering that multiple maximum points for the AF evaluation value are generated, if the multiple maximum points are generated, the maximum point estimated to be the most reliable may be set to an in-focus position by also considering the magnitude of the AF evaluation value at a peak position and the degree of falling or the degree of rising of the AF evaluation values in the surrounding position thereof.

Filter

FIGS. 22A to 22C depict examples of the coefficient of a digital filter set in a filter setting processing unit (108-6) included a control program (FIG. 15) which is described later. The digital filter by the set coefficient is a filter to transmit image data for calculating an AF evaluation value. FIG. 22A is an example of a coefficient of a digital filter being operated as a high-pass filter, FIG. 22B is as a band-pass filter, and FIG. 22C is as a low-pass filter. The digital filter using the coefficient of FIG. 22A functions as a high-pass filter by multiplying neighboring pixel data by the coefficients of "−1", "2", and "−1". A high-frequency band component is emphasized in the image data transmitted through the filter. In other words, the filter emphasizes the difference in brightness between the neighboring pixels.

The digital filter using the coefficient of FIG. 22B functions as a band-pass filter by respectively multiplying the neighboring pixel data by the coefficients of "−1", "0", "2", "0", and "−1". The digital filter using the coefficient of FIG. 22C functions as a low-pass filter by respectively multiplying the neighboring pixel data by the coefficients of "−1", "−1", "1", "2", "1", "−1", and "−1".

AF Processing Area

Figure 5A:
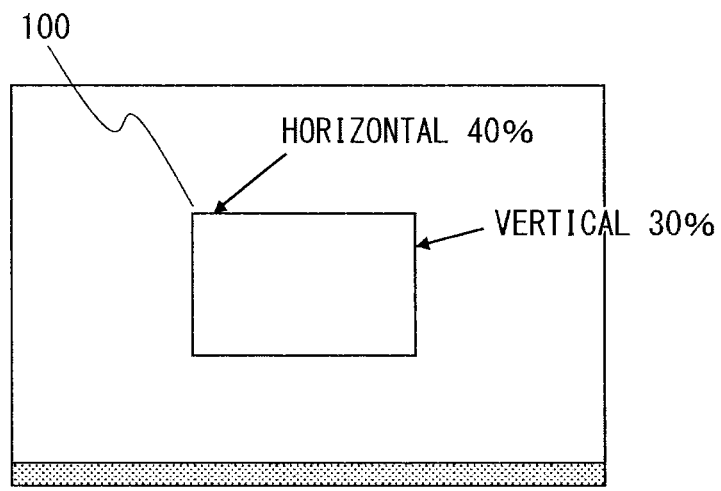
FIG. 5A is a view showing an example of a normal AF processing area and FIG. 5B is a view showing an example of an AF processing area when a face is detected in a target, displayed on a display unit of the imaging device.

Further, the image data used for calculating an AF evaluation value may be not of the entire pixel area but may be of a specific range in the digital RGB image data. For example, as shown in FIG. 5A, when an AF processing area 100 serving as an example of the specific range is set in the center of an image displayed on the LCD 10 during the operation in the finder mode, an AF evaluation value is calculated using image data in the AF processing area 100. The AF processing area 100 is set, for example, to be a range of 40% of the RGB image data on the center screen in the horizontal direction and 30% thereof in the vertical direction.

Calculation Timing of AF Evaluation Value

Next, a relation between the driving timing of the focus lens 7-2a and the calculation timing of the AF evaluation value at the AF processing is described. The focus lens 7-2a is moved by each VD signal. This movement amount (focus driving amount) is an amount corresponding to a predetermined number of drive pulses, for example, when the focus motor 7-2b is a pulse motor.

Single focus lens driving is completed such that in response to falling of a VD signal pulse, the focus lens 7-2a is driven at a predetermined pulse rate by the predetermined number of drive pulses. In response to falling of a next outputted VD signal pulse, the predetermined focus driving is performed again. In this way, the focus driving is performed in synchronization with the VD signal (in other words, a frame cycle).

Figure 20:
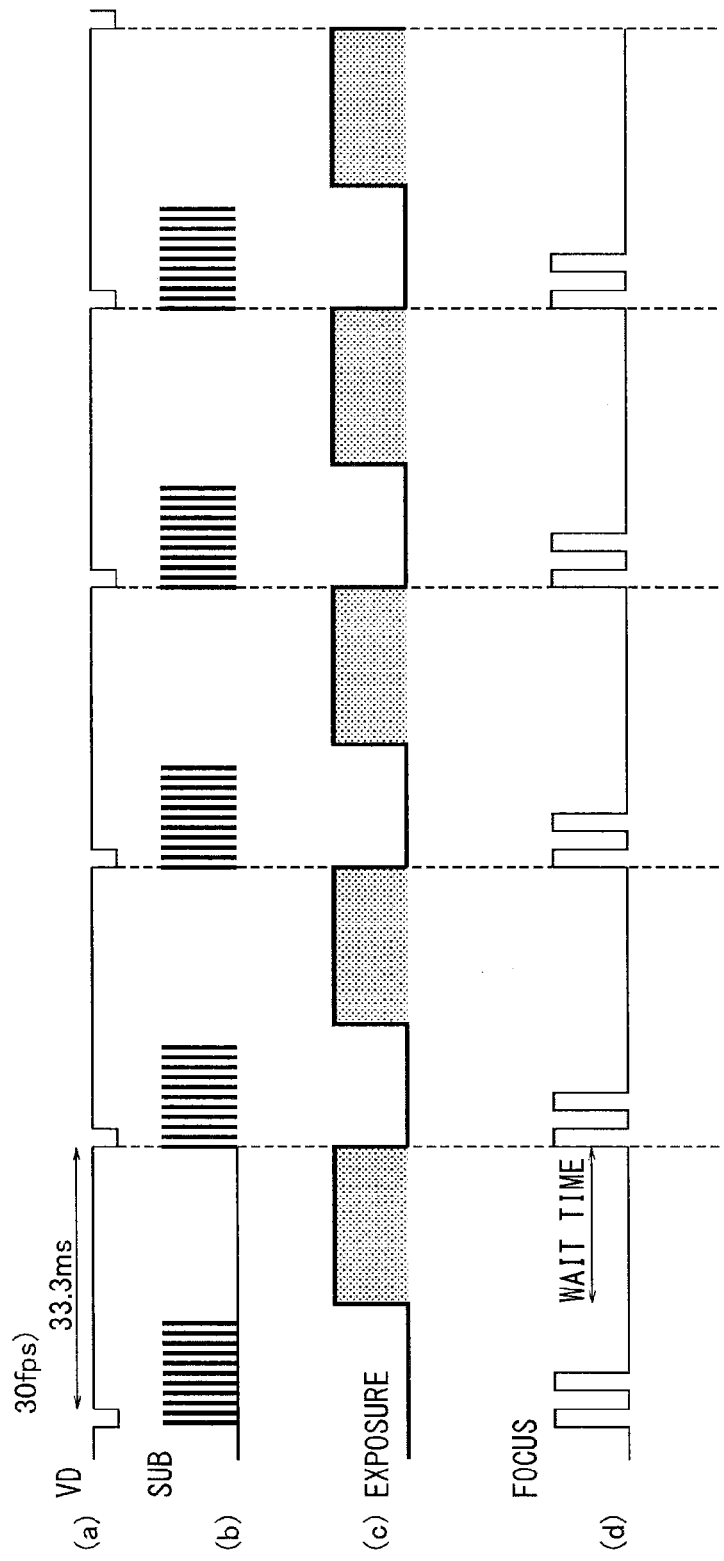
FIG. 20 is an example of a timing chart showing a VD signal when image data is captured, a focus driving timing of a lens, a charge discharge pulse timing of an electronic shutter, and an exposure timing, in the imaging device.

FIG. 20 is an example of a timing chart showing a relation between the moving timing of the focus lens 7-2a and the calculation timing of the AF evaluation value, at the AF processing. In FIG. 20, (a) depicts a VD signal to capture image data at a certain frame rate, (b) depicts a timing of an charge discharge pulse (SUB) in an electronic shutter, (c) depicts an exposure timing, and (d) depicts a moving timing of the focus lens 7-2a.

In FIG. 20, when a first VD signal (a) is generated, the first VD signal is used as a trigger to generate two pulses for deriving the focus motor 7-2b (d). In response to the pulses, the focus lens 7-2a is moved. Moreover, the VD signal (a) is used as a trigger to generate a predetermined number of charge discharge pulses (b). In accordance with the number of this charge discharge pulses (b), discharge processing of the charge charged on the CCD 101 is performed. After the charge discharge processing is completed, exposure processing (c) is performed. With the exposure processing (c), a video of a target is captured as image data via the imaging lens. The AF evaluation value is calculated by a predetermined calculation using the captured image data.

The number of drive pulses is variable and changes in accordance with the focal distance, the focus lens protrusion amount (focus driving range), or the like. The AF processing in the present embodiment is performed within the driving range of the focus lens 7-2a in synchronization with the VD signal.

Control Program

Figure 15:
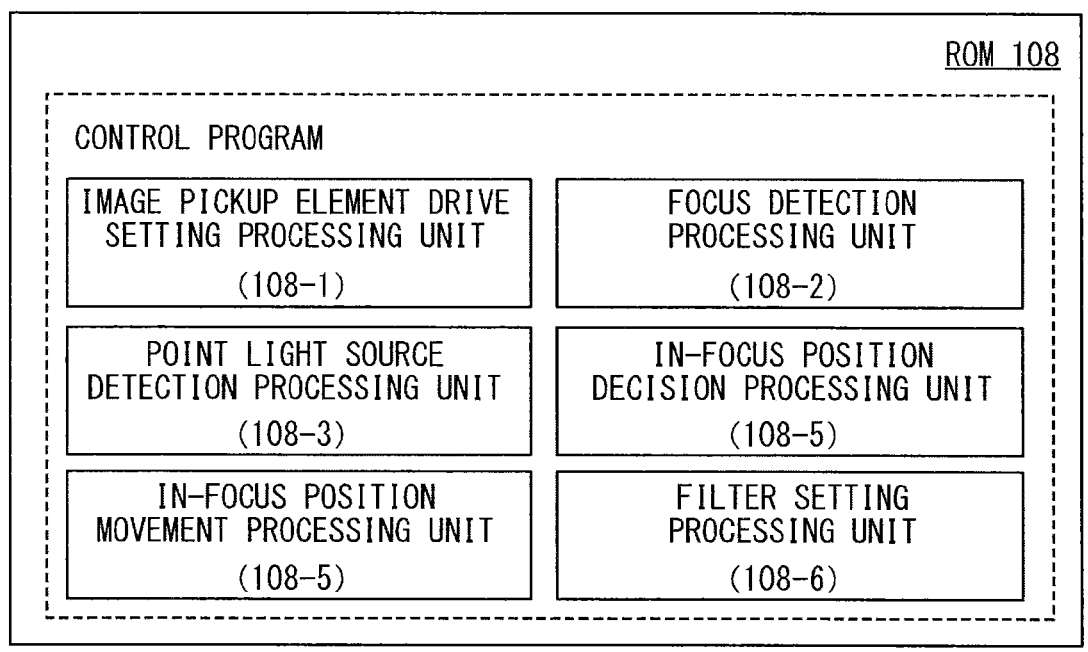
FIG. 15 is a block diagram showing a configuration example of a program to execute an imaging method according to the present invention.

The autofocus detection processing (AF processing) as described above is processing executed by a control program provided in the imaging device according to the present invention. The program to execute this autofocus detection processing (AF processing) is stored in the ROM 108 shown in FIG. 4. Here, an example of the control program stored in the ROM 108 is described. FIG. 15 is a function block diagram showing a configuration example of the control program stored in the ROM 108, in other words, a program to execute an imaging method according to the present invention using a mechanism provided in the imaging apparatus according to the present invention.

In FIG. 15, the control program includes an imaging element drive setting processing unit (108-1), a focus detection processing unit (AF scanning processing unit) (108-2), a point light source detection processing unit (108-3), an in-focus position decision processing unit (108-4), an in-focus position movement processing unit (108-5), and the filter setting processing unit (108-6).

The imaging element drive setting processing unit (108-1) performs processing of setting an operation mode of the CCD 101 which is an imaging element.

The focus detection processing unit (108-2) performs processing of determining, on the basis of AF evaluation values successively calculated while the focus lens 7-2a is being moved, a peak position of the AF evaluation values.

The point light source detection processing unit (108-3) performs processing of detecting whether or not a target environment is a point light source (dominant) environment.

The in-focus position decision processing unit (108-4) performs processing of deciding, on the basis of the peak position of the AF evaluation values detected by the focus detection processing unit (108-2), a position of the imaging lens corresponding to the peak position.

The in-focus position movement processing unit (108-5) performs processing of driving the focus motor 7-2b to move the focus lens 7-2a to the position decided by the in-focus position decision processing unit (108-4).

The filter setting processing unit (108-6) performs processing of setting or changing the coefficient of a filter to transmit image data used for calculation of the AF evaluation value, in accordance with a status of the in-focus position decision processing on the basis of the AF evaluation values.

Imaging Method (1)

Next, an embodiment of an imaging method according to the present invention is described. The imaging method described in the present embodiment is executed by the imaging element drive setting processing unit (108-1), the focus detection processing unit (108-2), the point light source detection processing unit (108-3), the in-focus position decision processing unit (108-4), the in-focus position movement processing unit (108-5), and the filter setting processing unit (108-6).

Figure 6:
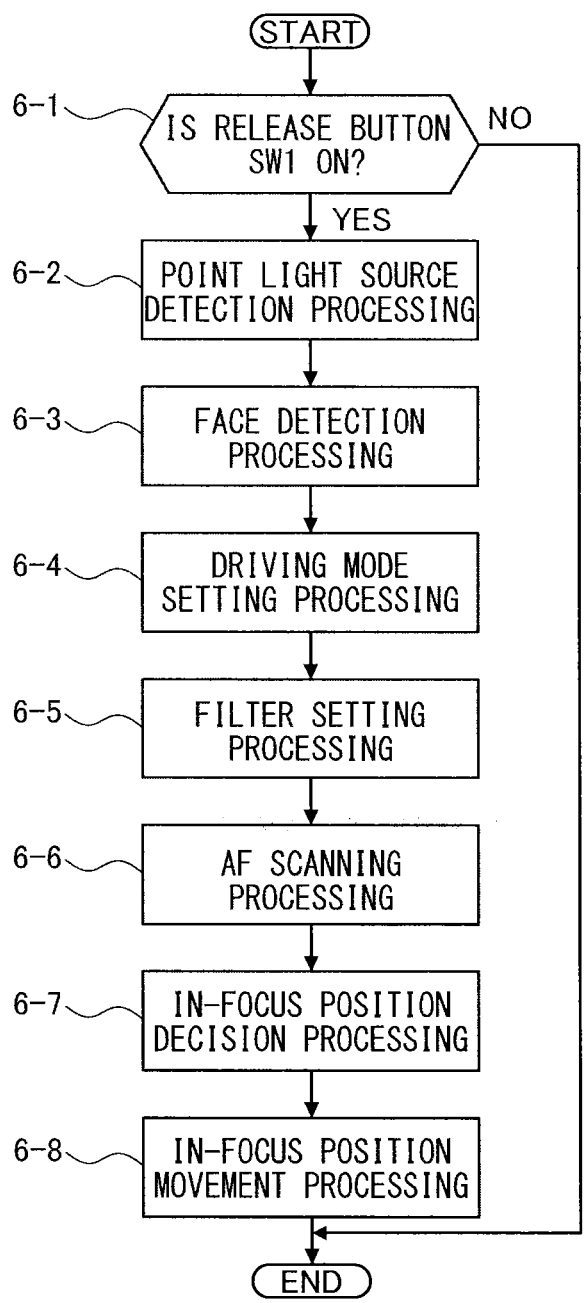
FIG. 6 is a flowchart showing an example of AF processing in the imaging device.

Firstly, AF processing executed in the digital camera 1 is described using a flowchart of FIG. 6. At first, processing of determining whether or not the release button SW1 is pressed is performed (6-1). If the release button SW1 is pressed (YES at 6-1), point light source detection processing (6-2) is performed. If the release button SW1 is not pressed (NO at 6-1), the AF processing is completed.

Figure 5B:
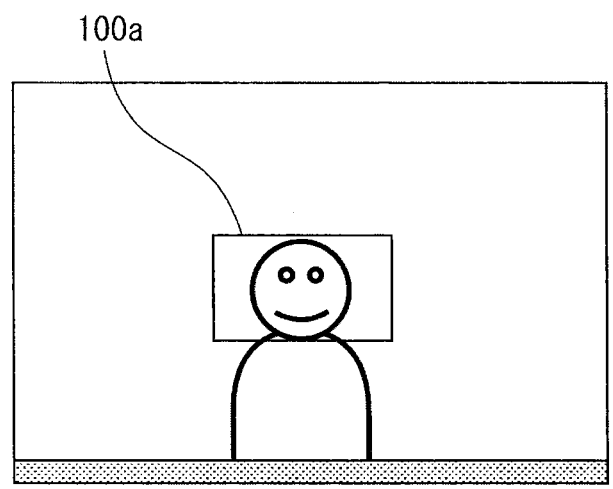

In accordance with a result of the point light source detection processing (6-2), face detection processing of detecting whether or not a target present in the AF processing area 100 includes a face of a person (6-3). In the face detection processing (6-3), if a face of a person is detected, processing of switching the AF processing area 100 to an AF processing area 100a including a face of a person as shown in FIG. 5B is performed. In the face detection processing (6-3), if no face of a person is detected, the AF processing area 100 is not switched.

Next, driving mode setting processing of changing the driving mode of the CCD 101 is performed (6-4). Next, from the set driving mode and the face detection result of the face detection processing (6-3), filter setting processing of setting the coefficient of a digital filter used for filter processing relative to image data used for calculation of the AF evaluation value is performed (6-5). Next, an image signal from the CCD 101 is read in accordance with the set driving mode, and image data is generated from the image signal. Processing of transmitting the generated image data through the digital filter with the coefficient set by the filter setting processing (6-5) is performed. AF scanning processing is performed (6-6) using the transmitted image data.

The details of the point light source detection processing (6-2), the driving mode setting processing (6-3), the filter setting processing (6-5), and the AF scanning processing (6-6) are described later.

On the basis of the peak position of the AF evaluation values determined by the AF scanning processing (6-6), in-focus position decision processing is performed (6-7). In the processing, if a peak of the AF evaluation values is detected in the AF scanning processing (6-6), the peak position is decided as an in-focus position. Moreover, if no peak position of the AF evaluation values is detected in the AF scanning processing (6-6), a position (NG position) specified in advance as "AFNG" is decided as an in-focus position (6-7). The NG position is a position of the focus lens 7-2a at which a target about 2.5 m away from the digital camera 1 is brought into focus, for example.

Finally, in-focus position movement processing of moving the focus lens 7-2a to the decided position is performed (6-8).

Figure 7:
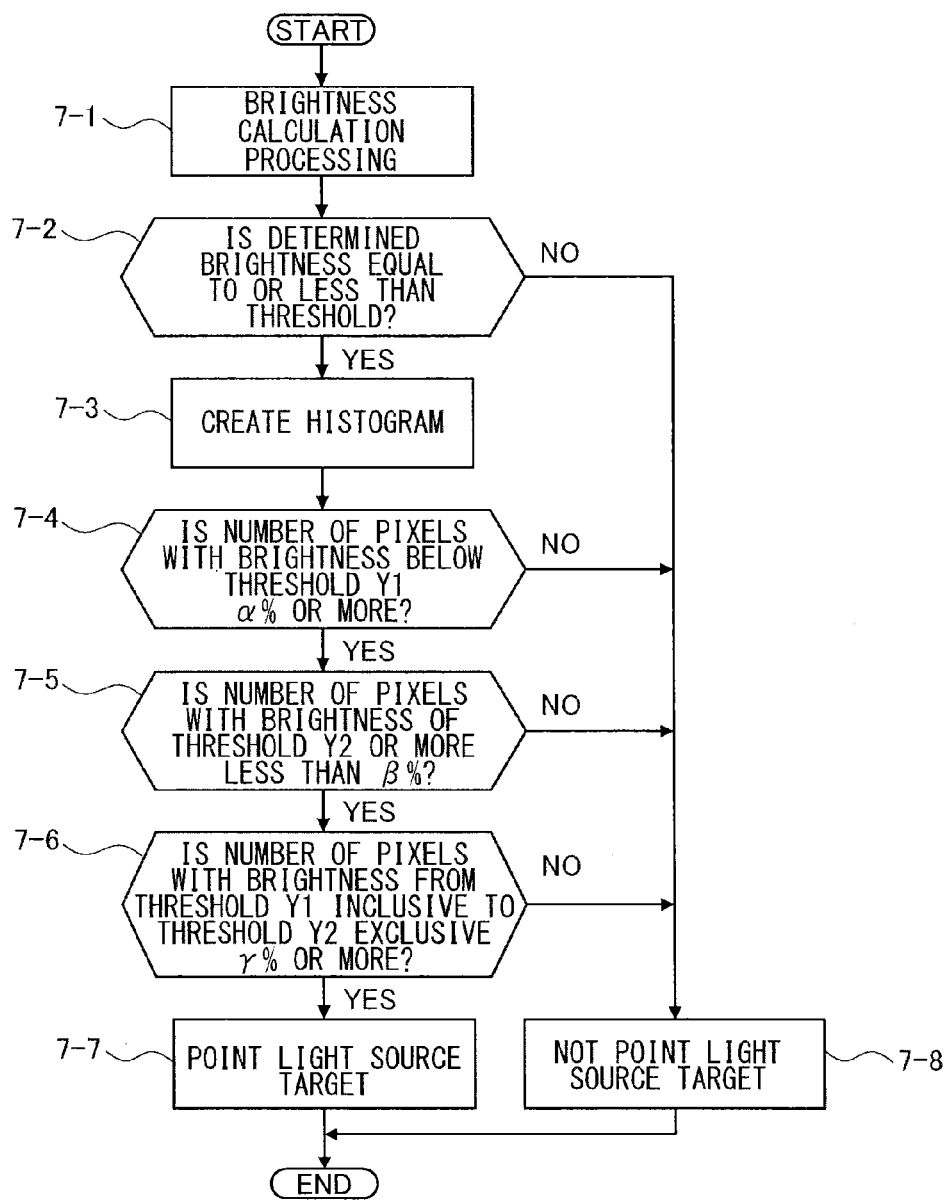
FIG. 7 is a flowchart showing an example of point light source detection processing in the imaging device.

Next, the detail of the point light source detection processing (6-2) is described using a flowchart of FIG. 7. The processing is processing of determining whether or not the target is a "point light source target" on the basis of brightness distribution of the target. Firstly, brightness calculation processing (7-1) is performed. This processing is processing for determining the brightness of the target, so to speak. The YUV image data generated by the YUV conversion of the CCD signal processing block 104-2 is vertically and horizontally divided into 16 areas each, 256 areas in total. An example of the divided YUV image data is shown in FIG. 12.

The brightness calculation processing (7-1) is processing of calculating, in the divided areas (brightness detection area) as shown in FIG. 12, an average value of Y (brightness) values (brightness value normalized by the maximum value of 255) in each brightness detection area, and creating a histogram which satisfies a predetermined condition. For example, an average value of the entire brightness detection area is calculated using each average value of the Y values calculated for each area. If the average value of the entire brightness detection area is equal to or less than a predetermined threshold (Y0, for example, 60) specified in advance (YES at 7-2), a histogram relative to all the pixels is created (7-3).

Figure 13:
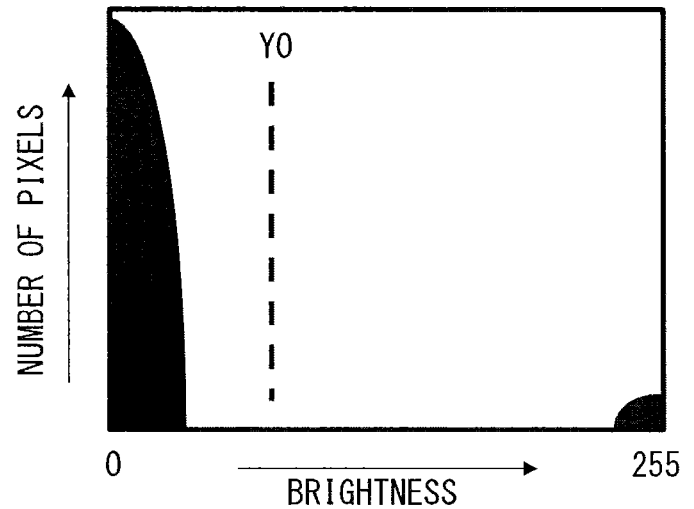
FIG. 13 is a histogram showing an example of brightness distribution of a target in the imaging device.

FIG. 13 depicts an example of a histogram created on the basis of the distribution created by the processing 7-3. The histogram as shown in FIG. 13 depicts distribution of the number of pixels for each brightness value when the horizontal axis indicates the normalized brightness values and the longitudinal axis indicates the number of pixels. FIG. 13 depicts an example of distribution when the target is a point light source target. It can be seen from FIG. 13 that when the target is a point light source target, a very large number of pixels have brightness lower than the threshold Y0 while a small number of pixels have brightness higher than the threshold Y0 is small.

Figure 14:
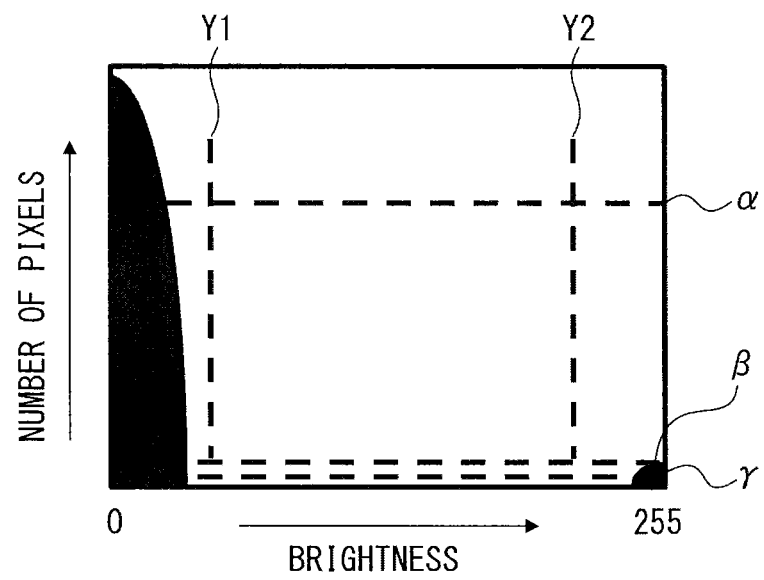
FIG. 14 is a histogram showing an example of a threshold used in the point light source detection processing with respect to the brightness distribution of the target in the imaging device.

In other words, by creating the histogram (FIG. 13) and determining distribution of the number of pixels relative to the brightness values, a determination is made on whether or not the target is a point light source target (7-3). The determination processing is performed using multiple indexes. FIG. 14 depicts an example of the thresholds which are multiple indexes used for the determination processing, overlapped on the histogram (FIG. 13).

Firstly, a determination is made on whether or not the ratio of the number of pixels indicating the low brightness relative to the total number of all the pixels is a certain value or more. In this processing, a threshold Y1 for the brightness and a threshold α for the number of pixels are used. If the number of pixels with the brightness at the threshold Y1 or less is α percent or more (YES at 7-4), the flow proceeds to the subsequent determination processing. If the condition is not satisfied (NO at 7-4), it is determined that the target is not a point light source target (7-8), the point light source detection processing is completed.

In the subsequent determination processing (7-5), a threshold Y2 for the brightness and a threshold β for the number of pixels are used. If the number of pixels with the brightness at the threshold Y2 or more is less than β percent (YES at 7-5), the flow proceeds to the subsequent determination processing. If the condition is not satisfied (NO at 7-5), it is determined that the target is not a point light source target (7-8), the point light source detection processing is completed.

In the subsequent determination processing (7-6), the thresholds Y1 and Y2 for the brightness and a threshold γ for the number of pixels are used. If the number of pixels with the brightness from the threshold Y1, inclusive, and to the threshold Y2, exclusive, is γ percent or less (YES at 7-6), it is determined that the target is a point light source target (7-7). If the condition is not satisfied (NO at 7-6), it is determined that the target is not a point light source target (7-8), the point light source detection processing is completed.

As described above, when the most part of the target corresponds to the point light source, the average value of the brightness values of the target image is low. Moreover, in the distribution of the pixels, there are many of the pixels with the low brightness, the pixels with the high brightness only at positions "corresponding to the point light sources", and almost no pixel with the intermediate brightness. Accordingly, it is possible to determine whether or not the target is a point light source target with the condition determinations from 7-4 to 7-6.

Figure 8:
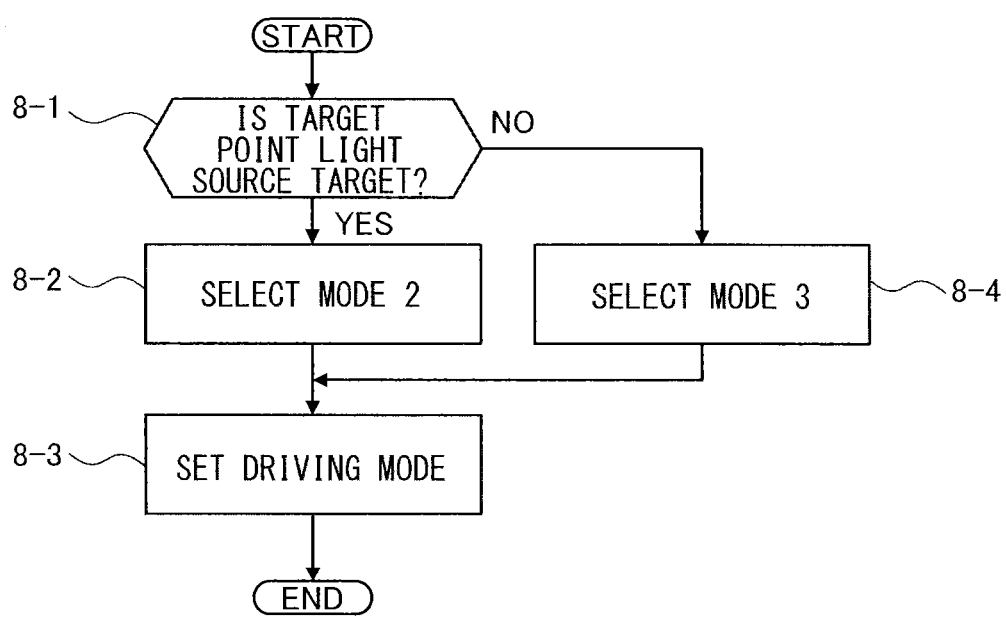
FIG. 8 is a flowchart showing an example of driving mode setting processing in the imaging device.

Next, the detail of the driving mode setting processing (6-4) is described using the flowchart of FIG. 8. If it is determined that the target is a point light source target in the processing 6-2 (YES at 8-1), the "mode 2" is selected as a driving mode for the CCD 101 (8-2). If it is not determined that the target is a point light source target in the processing 6-2 (NO at 8-1), a default mode (mode 3) is selected as an operation mode for the CCD 101 (8-4). Next, the selected driving mode is set to the CCD 101 (8-3), and the driving mode setting processing (6-4) is completed.

The CCD 101 set in the mode 3 outputs an image signal by "horizontal 4-pixel addition and vertical 2-pixel reduction". Meanwhile, the CCD 101 set in the mode 2 outputs an image signal by "horizontal 2-pixel addition and vertical 2-pixel addition". When the mode 2 is set, in the image signal, four pixels are outputted as one pixel. Accordingly, the number of pixels on the image data is different from the number of pixels included in the CCD 101. However, the sensitivity of the imaging element does not change.

Figure 25A:
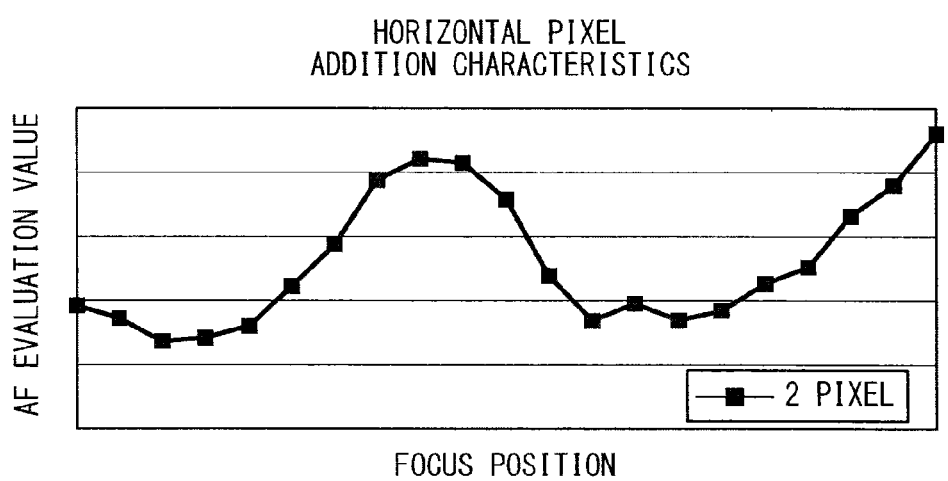
FIGS. 25A to 25C depict examples of shifts of the AF evaluation values due to a difference in the number of horizontal pixels added.
Figure 25B:
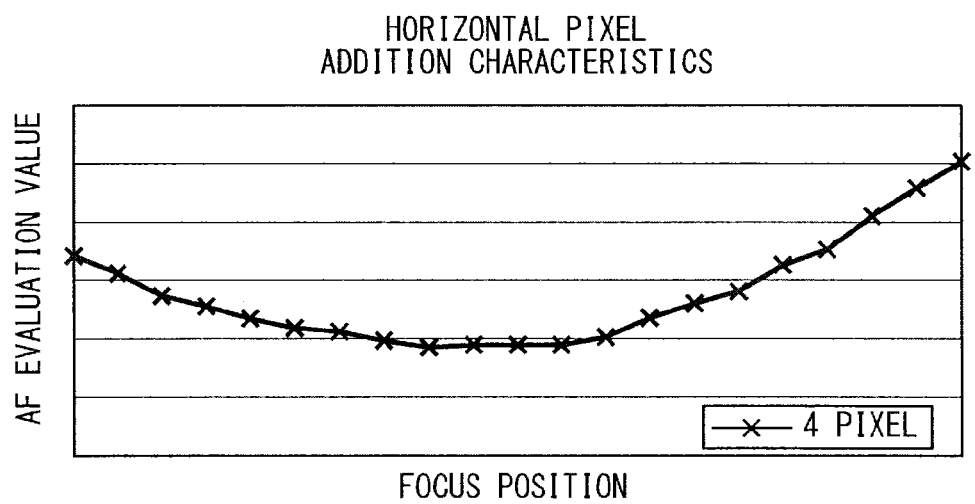
Figure 25C:
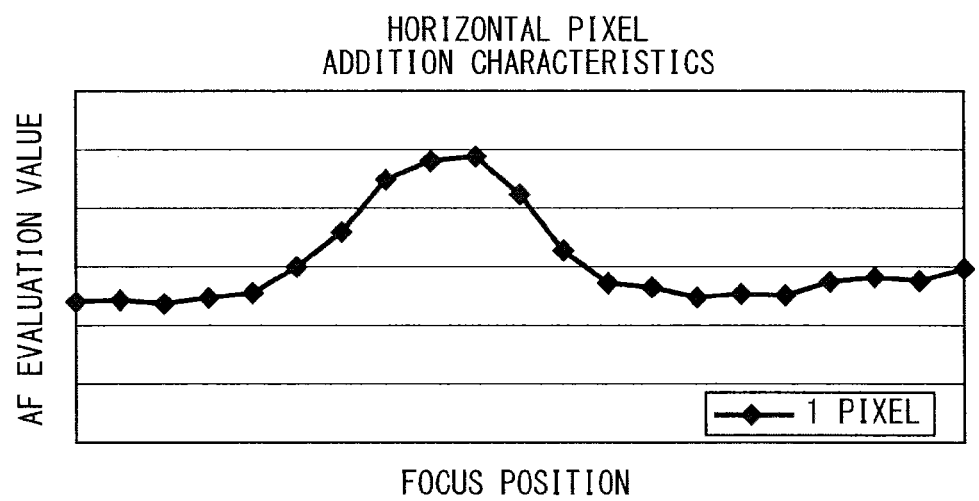
Figure 26A:
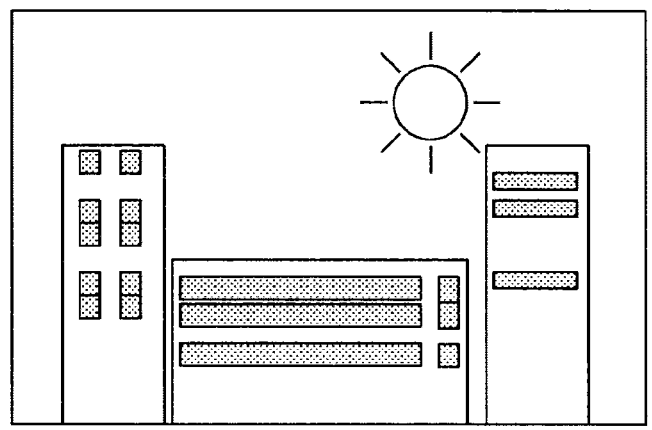
FIGS. 26A to 26C are views for explaining an operation in the imaging device.
Figure 26B:
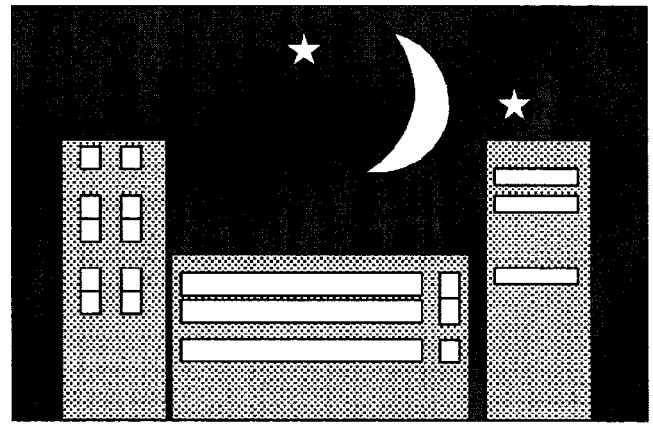
Figure 26C:
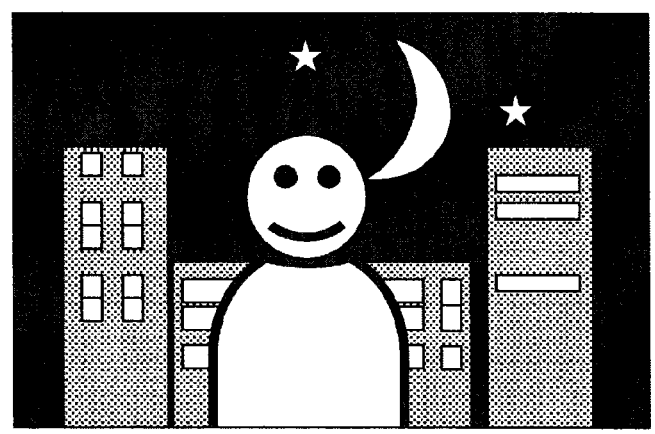

Here, shifts in the AF evaluation values due to the difference between the operation modes are described using FIGS. 25A to 25C. FIGS. 25A to 25C are graphs showing an example of shifts in the AF evaluation values calculated when the number of horizontal pixels added for the same target is changed. In FIGS. 25A to 25C, the horizontal axis indicates the lens position and the longitudinal axis indicates the AF evaluation value. FIG. 25A depicts an example of horizontal 2-pixel addition, FIG. 25B depicts an example of horizontal 4-pixel addition, and FIG. 25C depicts an example of no addition.

Even in a state where the peak of the AF evaluation values is generated at almost the center of the lens position as shown in FIG. 25C, the peak of the AF evaluation values is not generated at the same lens position but is the lowest position in the horizontal 4-pixel addition (corresponding to the mode 3) in FIG. 25B. On the other hand, in the horizontal 2-pixel addition (corresponding to the mode 2) as shown in FIG. 25A, the peak of the AF evaluation values is generated at the same lens position. Therefore, it is possible to accurately determine the peak of the AF evaluation values for the point light source target by changing the number of horizontal pixels added.

The mode 3 (horizontal 4-pixel addition) is different from the mode 2 (horizontal 2-pixel addition) with respect to the total number of pixels in addition to the addition method. Accordingly, the more time is required for the transfer processing of the image signal in the mode 2 than in the mode 3. Accordingly, the driving mode of the CCD 101 is set to the "mode 3" in the finder mode in order to transfer images at a predetermined frame rate. To deal with the slower frame rate, pixels at the vertical side can be reduced to decrease the number of pixels to be captured (the same frame rate can be set in the mode 2 and the mode 3).

Figure 28:
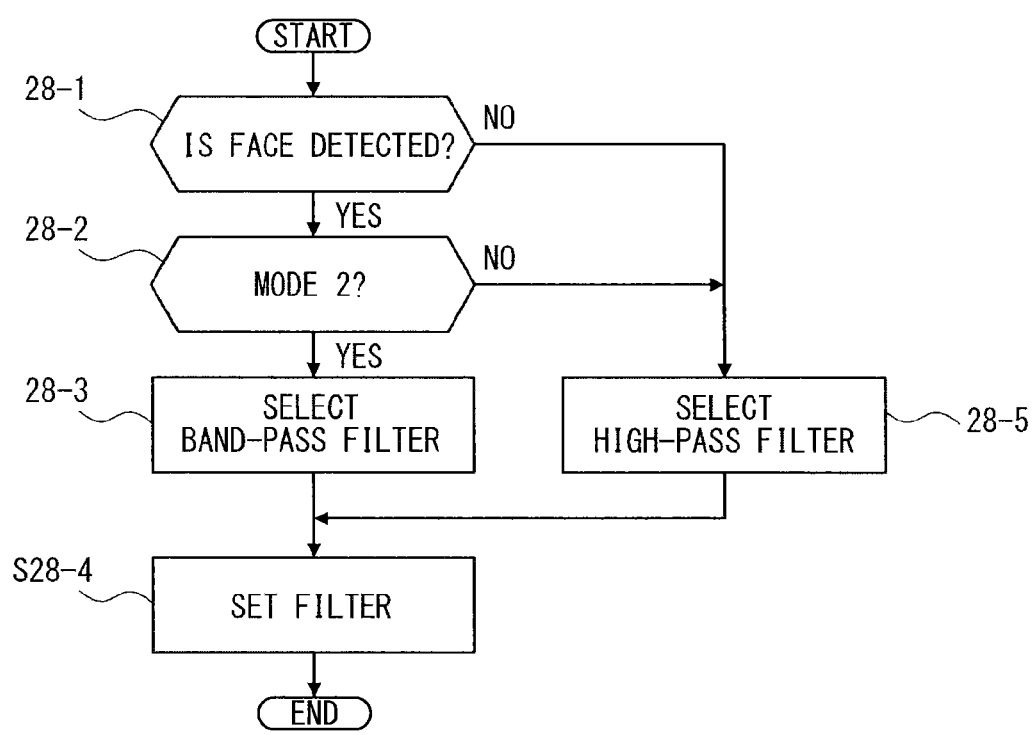
FIG. 28 is a flowchart showing an example of filter setting in the imaging device.

Next, the detail of the filter setting processing (6-5) is described using a flowchart of FIG. 28. Firstly, a determination is made on whether or not a face of a person is detected in the face detection processing (6-3) mentioned above (28-1). If a face is detected (YES at 28-1), a determination is made on whether or not an already set driving mode is the "mode 2" (S28-2). If the driving mode is the "mode 2" (YES at 28-2), the coefficient of a band-pass filter is selected as that of a digital filter (28-3). If no face is detected (NO at 28-1) or the driving mode is not the "mode 2" (NO at 28-2), the target is a simple point light source, and thus the coefficient of a high-pass filter is selected as that of a digital filter (28-5). Next, the filter setting processing unit (108-6) sets the coefficient of the selected filter as a digital filter (28-4).

Therefore, under the point light source, pixel addition and reduction need to be eliminated as much as possible to eliminate a false in-focus. In addition, when a face is detected, the target component tends to be close to the low-frequency band side. Accordingly, the coefficient of the filter is changed so as to be transmitted through the low-frequency band, thereby making it possible to further improve the AF accuracy.

Figure 10:
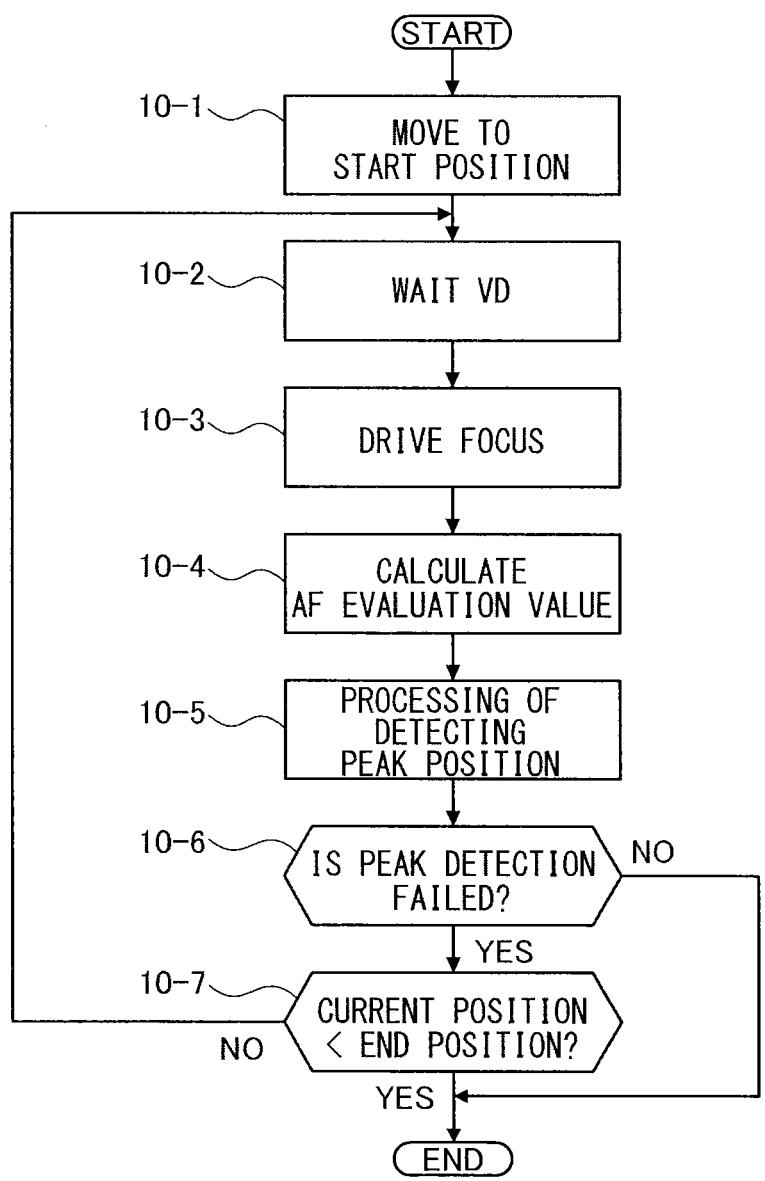
FIG. 10 is a flowchart showing an example of the AF scanning processing in the imaging device.

Next, the detail of the AF scanning processing (6-6) is described using a flowchart of FIG. 10. Note that, before the processing, the driving mode of the CCD 101 is being set in the processing 6-4 and the filter coefficient selected in the processing 6-5 is set to a digital filter, which is not illustrated.

Firstly, the focus lens 7-2a is moved to an AF scanning start position (10-1). The AF scanning start position differs depending on the focus driving direction in the AF scanning processing. Here, for example, assuming that the focus driving direction is a direction along which the focus lens is moved from a close side toward the infinite distant side. In this case, firstly, the start position is set to the close side. The close position (start position at the close side) differs depending on the focal distance or the lens characteristics. For example, the close position is set to 30 cm.

Next, the processing waits for detection of a falling of the VD signal (10-2). When the falling of the VD signal is detected, the focus motor 7-2b is driven in accordance with a predetermined number of pulses to move the focus lens 7-2a (10-3).

At a position where the focus lens 7-2a is moved, an image signal is acquired. The image signal here is acquired from the CCD 101 driven in the driving mode set in the driving mode setting processing (6-4 of FIG. 6). Subsequently, image data is generated from the acquired image signal, and the generated image data is caused to be transmitted through the digital filter set in the processing (6-5). An AF evaluation value is calculated on the basis of the image data caused to be transmitted (10-4).

Subsequently, processing of detecting a peak position of the calculated AF evaluation values is performed (10-5). This processing detects the maximum value of the AF evaluation value. Subsequently, a determination is made on whether or not the peak of the AF evaluation values is detected (10-6). If no peak of the AF evaluation values is detected (YES at 10-6), a determination is made on whether or not the current position of the focus lens 7-2a is an end position (10-7). If the position of the focus lens 7-2a is not the end position (NO at 10-7), the flow returns to the "waits the VD signal (10-2)", and the processing described above is repeated to detect the peak of the AF evaluation values. If the peak is detected in the peak position detection processing (10-5) (NO at 10-6), the AF processing is completed.

With the embodiment described above, when a target is determined as a point light source target, the driving mode of the imaging element is changed from the default mode to a mode with the improved sensitivity and the higher brightness. The AF processing can be performed by subjecting an optimal digital filter to image data used for calculation of an AF evaluation value on the basis of the determination whether or not a person is included in the target. Thereby, automatic and accurate in-focus can be achieved with respect to the point light source target of which in-focus position cannot be specified by the conventional AF processing because no peak of the AF evaluation values can be detected.

Imaging Method (2)

Figure 9:
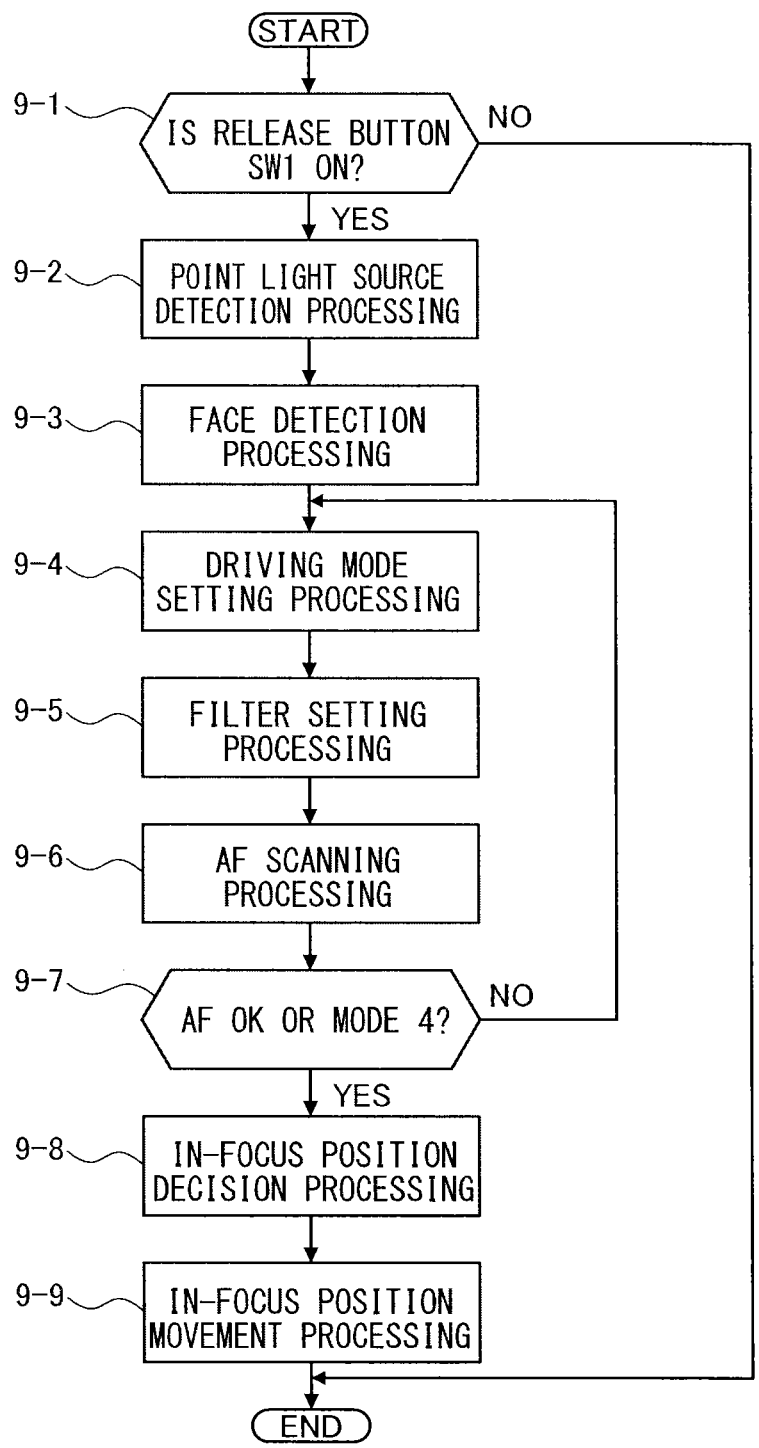
FIG. 9 is a flowchart showing another example of the AF processing in the imaging device.

Next, another embodiment of an imaging method according to the present invention is described. Firstly, AF processing in the present embodiment is described using a flowchart of FIG. 9. Processing of determining whether or not the release button SW1 is pressed is performed (9-1). If the release button SW1 is not pressed (NO at 9-1), the AF processing is completed.

If the release button SW1 is pressed (YES at 9-1), a determination is made on whether or not a point light source in which point light source detection processing is performed is present (9-2), and subsequently, face detection processing is performed (9-3). Next, in accordance with a result of the point light source detection processing (9-2), driving mode setting processing of changing the driving mode of the CCD 101 is performed (9-4). Next, on the basis of the driving mode and a result of the face detection processing (9-3), filter setting processing of setting the coefficient of a digital filter used for filter processing relative to image data used for calculation of an AF evaluation value is performed (9-5). Next, an image signal from the CCD 101 is read in accordance with the set driving mode, and image data is generated from the image signal. Processing of transmitting the generated image data through the digital filter of the coefficient set by the filter setting processing (9-5). The AF scanning processing is performed using the transmitted image data (9-6).

The point light source detection processing (9-2) and the AF scanning processing (9-6) are similar to the point light source detection processing (6-2) and the AF scanning processing (6-6) in the embodiment already described, and therefore the explanations thereof are omitted. The details of the driving mode setting processing (9-3) and the filter setting processing (9-5) different from those in the previous embodiment are described later.

If the peak of the AF evaluation values is detected by the AF scanning processing (9-6) or the driving mode set in driving mode setting processing (9-4) is set to the mode 4 (YES at 9-7), on the basis of a position of the peak of the AF evaluation values determined by the AF scanning processing (9-6), the in-focus position decision processing is performed (9-8). In the processing, a position where the peak of the AF evaluation values is detected is decided as an in-focus position.

Further, if no peak position of the AF evaluation values is detected in the AF scanning processing (9-6), a position (NG position) specified in advance as "AFNG" is decided as an in-focus position. The NG position is a position of the focus lens 7-2a at which a target about 2.5 m away from the digital camera 1 is brought into focus, for example.

Finally, processing of moving the focus lens to the in-focus position is performed (9-9). If neither a peak is detected by the AF scanning processing (9-6) nor the driving mode is set to the mode 4 (NO at 9-7), the driving mode is reset (9-4) and the filter is reset (9-5), and then the AF processing is executed again.

Figure 11:
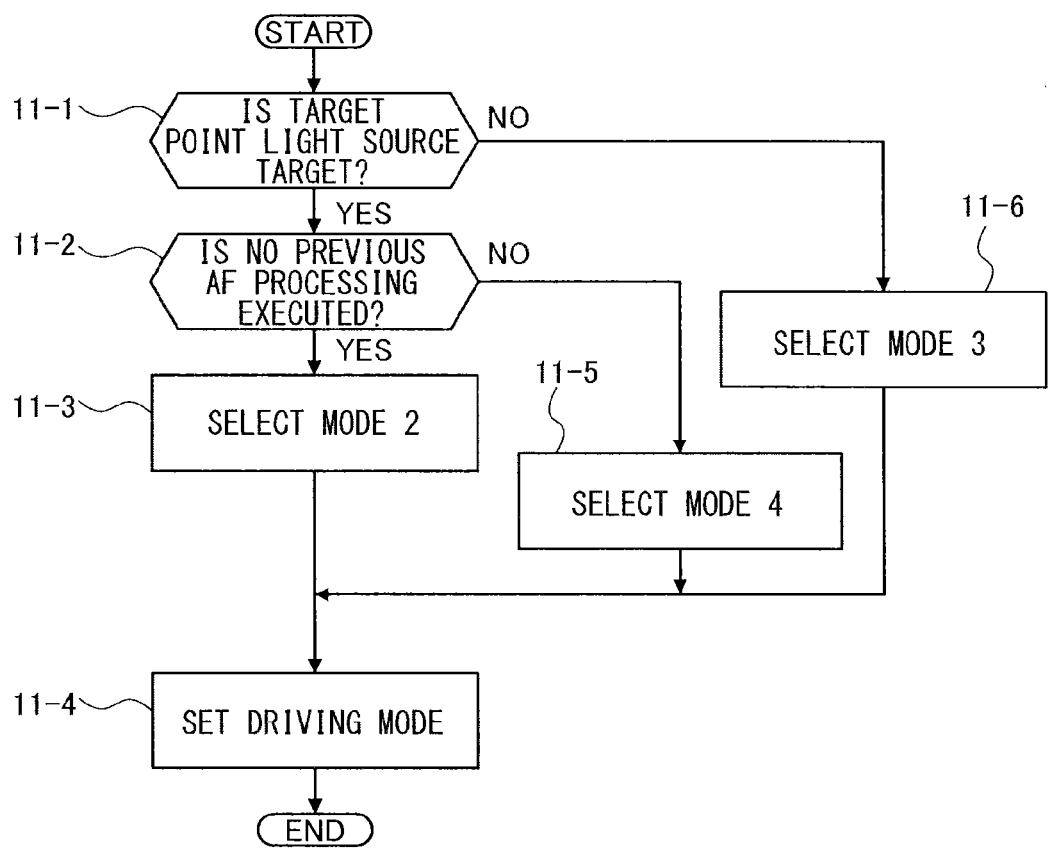
FIG. 11 is a flowchart showing another example of the driving mode setting processing in the imaging device.

Here, the detail of the driving mode setting processing (9-4) is described using a flowchart of FIG. 11. If it is determined that the target is a point light source target in the point light source detection processing (9-2) (YES at 11-1), a determination is made on whether or not the AF processing is already executed (11-2). If the AF processing is not executed (YES at 11-2), the "mode 2" is selected as the driving mode of the CCD 101 (11-3).

If the AF processing is already executed (NO at 11-2), the peak of the AF evaluation values cannot be detected in the set driving mode of the "mode 2", and therefore the "mode 4" is set as the driving mode (11-5). If it is not determined that the target is a point light source target in the point light source detection processing (9-2) (NO at 11-1), the "mode 3" is selected as the driving mode (11-6). The selected driving mode is set (11-4), and the driving mode setting processing (9-4) is completed.

Figure 29:
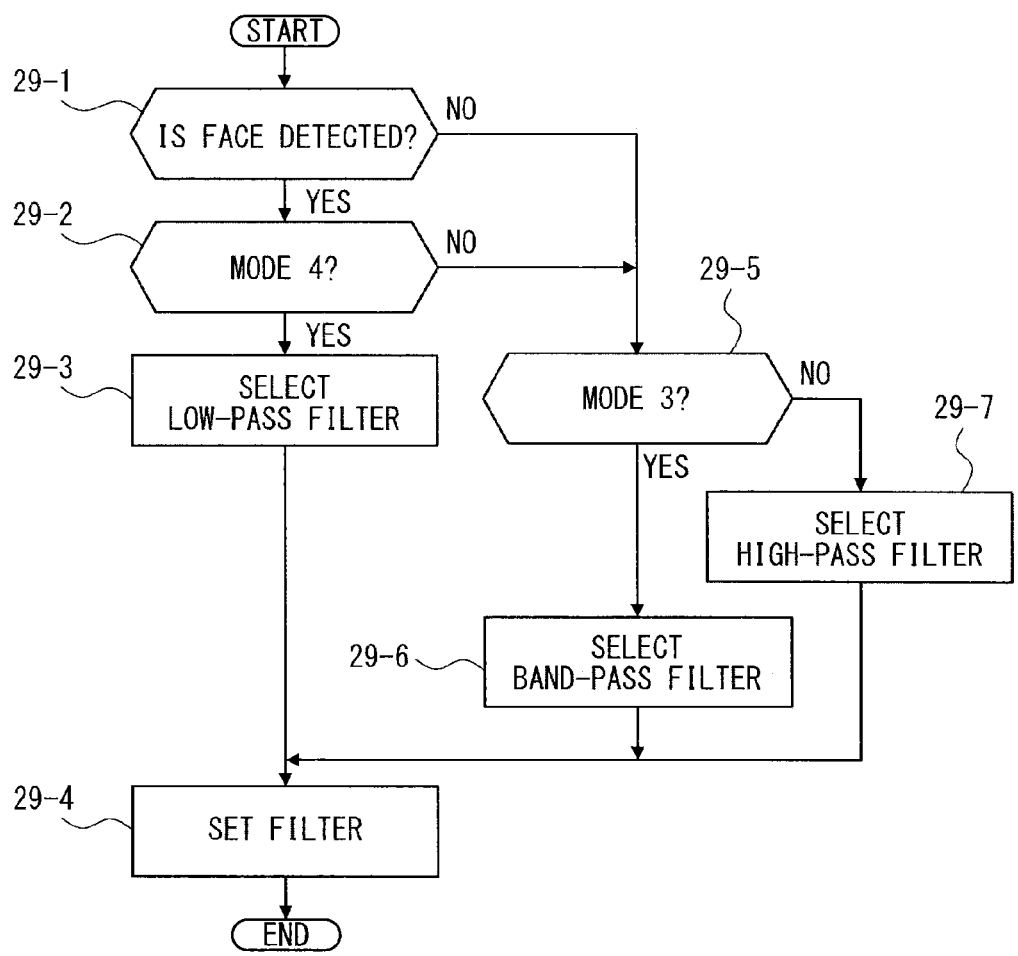
FIG. 29 is another flowchart showing an example of the filter setting in the imaging device.

Next, the detail of the filter setting processing (9-5) is described using a flowchart of FIG. 29. Firstly, a determination is made on whether or not a face of a person is detected in the face detection processing (9-3) mentioned above (29-1). If a face is detected (YES at 29-1), a determination is made on whether or not the already set driving mode is the "mode 4" (29-2). If the driving mode is the "mode 4" (YES at 29-2), the coefficient of a low-pass filter is selected as that of a digital filter (29-3). If no face is detected (NO at 29-1) or the driving mode is not the "mode 4" (NO at 29-2), a determination is made on whether or not the driving mode is the "mode 3" (29-5). If the driving mode is the "mode 3" (YES at 29-5), the coefficient of a band-pass filter is selected as that of a digital filter (29-6). If the driving mode is not the "mode 3" (NO at 29-5), the coefficient of a high-pass filter is selected as that of a digital filter (29-7).

Therefore, in accordance with a result of the face detection and the set driving mode, the frequency band of the digital filter for transmitting the image data is gradually shifted. The frequency band through which the image data is transmitted is shifted from the high-frequency band to the low-frequency band, specifically, from the high-pass filter, the band-pass filter, to the low-pass filter. This allows the filter to be stepwisely set, and to allow an optimal filter to be selected in any driving mode.

Therefore, under the point light source, pixel addition and reduction need to be eliminated as much as possible to eliminate a false in-focus. In addition, when a face is detected, the frequency band of the target tends to be close to the low-frequency band side. To cope with this tendency, a filter to the image data used for calculation of the AF evaluation value is changed to a filter which transmits the low-frequency band. This makes it possible to improve the AF accuracy. Finally, the selected filter is set (29-4).

The default driving mode of the CCD 101 which is the imaging element is the mode 3. The mode 3 is a mode to operate the CCD 101 by horizontal 4-pixel addition and vertical 2-pixel reduction, and the number of pixels to be added is four pixels. Meanwhile, the mode 2 indicates "horizontal 2-pixel addition and vertical 2-pixel addition", and therefore the number of pixels to be added are four pixels (2×2). Moreover, although the number of pixels to be added is different between in the mode 2 and in the mode 4 because the mode 4 is "no horizontal pixel addition and vertical 4-pixel addition", the mode 2 and the mode 4 have the same sensitivity of the imaging element.

Figure 24:
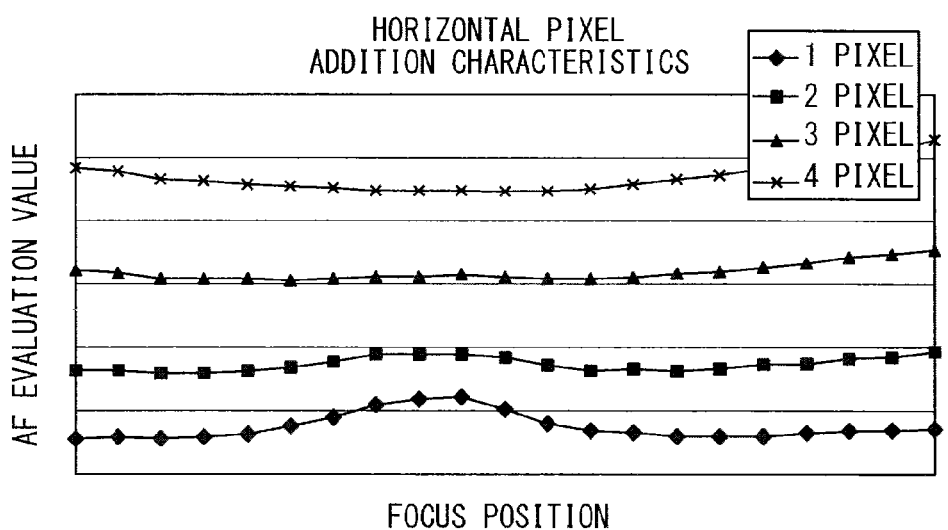
FIG. 24 is a graph showing an example of shifts of the AF evaluation values due to a difference in the number of horizontal pixels added of the imaging element.

As already described, change characteristics of the calculated AF evaluation value differ depending on the driving mode set to the CCD 101 (see FIG. 24). Accordingly, changing the number of horizontal pixels added allows AF processing with high accuracy even with respect to the point light source target.

With the embodiments described above, when a point light source is determined, the AF processing is performed by changing the number of horizontal pixels added. This makes it possible to accurately detect a peak with respect to the point light source target of which peak cannot be detected conventionally. Moreover, the number of pixels added is changed as appropriate to make it possible to accurately execute AF processing with respect to a target of which peak is difficult to be detected.

Although the three types of filters are exemplified as a filter through which image data used for calculation of an AF evaluation value is transmitted in the embodiments above, the present invention is not limited thereto. The FIR (Finite Impulse Response) filter or the IIR (Infinite Impulse Response) filter may be used.

As described above, with the imaging device according to the present invention, accurate in-focus processing can be performed on a target in low contrast or a point light source dominant target, by changing the driving mode of the imaging element to change the number of horizontal pixels added.

With the embodiments as described above, the autofocus processing can be accurately performed even on a target including a person under a point light source target dominant environment.

Although the embodiments of the present invention have been described above, the present invention is not limited thereto. It should be appreciated that variations may be made in the embodiment described by persons skilled in the art without departing from the scope of the present invention.

What is claimed is:

1. An imaging device, comprising:
   an imaging element configured to output an image signal in accordance with a target image acquired via an imaging lens;
   an autofocus detector configured to decide a focus in accordance with image data obtained from the image signal;
   a lens mover configured to move the imaging lens based on the focus;
   a driving condition setter configured to set a driving condition of the imaging element;
   a point light source detector configured to determine whether or not a target in the image data is a point light source target based on a brightness component of the image data;
   a target detector configured to detect the target from the image data; and
   a filter selector configured to select a filter through which the image data is to be transmitted, wherein
   the driving condition setter is configured to set the driving condition of the imaging element based on a determination result by the point light source detector of whether or not the target in the image data is the point light source target based on the brightness component of the image data,
   the filter selector is configured to select the filter based on the driving condition of the imaging element and a detection result by the target detector, the autofocus detector is configured to decide the focus based on the image data which is transmitted through the selected filter, and in a case where the point light source detector determines that the target is the point light source target, the driving condition setter is configured to set the driving condition of the imaging element such that a number of pixels added in a horizontal direction of the imaging element is smaller than that in a case where the point light source detector determines that the target is not the point light source target.

2. The imaging device according to claim 1, wherein the target detector is configured to detect a face of a person, and in a case where the target detector detects the face of the person, the filter selector is configured to select the filter which transmits a lower frequency band of the image data than that in a case where the target detector does not detect the face of the person.

3. The imaging device according to claim 1, wherein in a case where the autofocus detector fails to determine the focus, the driving condition setter is configured to change the driving condition of the imaging element such that the number of pixels added in the horizontal direction of the imaging element is smaller than that in a case where the autofocus detector succeeds in determining the focus.

4. The imaging device according to claim 1, wherein the point light source detector determines whether or not the target is the point light source target using distribution of the brightness component.

5. The imaging device according to claim 1, wherein the driving condition setter is configured to change the driving condition in a case where the autofocus detector fails to detect the focus after the driving condition is changed.

6. An imaging method executed in an imaging device which includes: an imaging element configured to output an image signal in accordance with a target image acquired via an imaging lens; an autofocus detector configured to decide a focus in accordance with image data obtained from the image signal; and a lens mover configured to move the imaging lens based on the focus, the imaging method comprising:

setting a driving condition of the imaging element;

determining whether or not a target in the image data is a point light source target based on a brightness component of the image data;

detecting the target from the image data; and selecting a filter through which the image data is to be transmitted, wherein the driving condition of the imaging element is set based on a determination result of whether or not the target in the image data is the point light source target based on the brightness component of the image data, the filter is selected based on the driving condition of the imaging element and a detection result of said detecting, the autofocus detector is configured to decide the focus based on the image data which is transmitted through the selected filter, and in a case where the target is determined to be the point light source target, setting the driving condition of the imaging element such that a number of pixels added in a horizontal direction of the imaging element is smaller than that in a case where the target is determined not to be the point light source target.

* * * * *